US012799244B2

(12) United States Patent
Yamazaki et al.

(10) Patent No.: US 12,799,244 B2
(45) Date of Patent: Nov. 17, 2026

(54) METHOD FOR PRODUCING FLUOROPOLYMER COMPOSITION

(71) Applicant: DAIKIN INDUSTRIES, LTD., Osaka (JP)

(72) Inventors: Ranna Yamazaki, Osaka (JP); Taketo Kato, Osaka (JP); Taku Yamanaka, Osaka (JP); Hirotoshi Yoshida, Osaka (JP); Takuya Yamabe, Osaka (JP); Akiho Ogura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 658 days.

(21) Appl. No.: 18/349,314

(22) Filed: Jul. 10, 2023

(65) Prior Publication Data

US 2023/0348637 A1 Nov. 2, 2023

Related U.S. Application Data

(63) Continuation of application No. PCT/JP2022/003337, filed on Jan. 28, 2022.

(30) Foreign Application Priority Data

Jan. 28, 2021 (JP) ................................ 2021-012507

(51) Int. Cl.

| | |
|---|---|
| ***C08F 14/18*** | (2006.01) |
| ***C08F 2/26*** | (2006.01) |
| ***C08F 6/20*** | (2006.01) |
| ***C08F 6/22*** | (2006.01) |
| ***C08F 6/24*** | (2006.01) |
| ***C08F 14/26*** | (2006.01) |
| ***C08F 114/26*** | (2006.01) |
| ***C08K 5/14*** | (2006.01) |

(52) U.S. Cl.

CPC .............. *C08F 114/26* (2013.01); *C08F 2/26* (2013.01); *C08F 6/20* (2013.01); *C08F 6/22* (2013.01); *C08F 14/18* (2013.01); *C08K 5/14* (2013.01)

(58) Field of Classification Search

CPC ............ C08F 4/18; C08F 14/26; C08F 6/003; C08F 6/20; C08F 6/22; C08F 6/24

See application file for complete search history.

(56) References Cited

U.S. PATENT DOCUMENTS

| | | | | |
|---|---|---|---|---|
| 8,329,813 | B2 * | 12/2012 | Johnson | C08F 14/18 524/544 |
| 9,644,055 | B2 * | 5/2017 | Yoshimura | C08F 216/1475 |
| 10,047,175 | B2 * | 8/2018 | Yamanaka | C08F 6/16 |
| 2010/0160490 | A1 | 6/2010 | Leffew et al. | |
| 2010/0204345 | A1 | 8/2010 | Yamanaka et al. | |
| 2010/0286330 | A1 | 11/2010 | Johnson et al. | |
| 2011/0152387 | A1 | 6/2011 | Leffew et al. | |
| 2012/0028046 | A1 | 2/2012 | Ono et al. | |
| 2012/0116003 | A1 * | 5/2012 | Brothers | C08F 2/16 524/394 |
| 2015/0183898 | A1 | 7/2015 | Yamanaka et al. | |
| 2016/0347895 | A1 | 12/2016 | Morikawa et al. | |
| 2019/0185599 | A1 | 6/2019 | Hintzer et al. | |
| 2021/0363031 | A1 | 11/2021 | Taira et al. | |
| 2023/0348636 | A1 * | 11/2023 | Yamazaki | C08F 14/26 |

FOREIGN PATENT DOCUMENTS

| | | | | |
|---|---|---|---|---|
| CN | 102264774 | A | 11/2011 | |
| CN | 102356095 | A | 2/2012 | |
| CN | 104403036 | A * | 3/2015 | C08F 114/26 |
| CN | 105980415 | A | 9/2016 | |
| JP | 2003-119204 | A | 4/2003 | |
| JP | 2008-285449 | A | 11/2008 | |
| JP | 2012-513530 | A | 6/2012 | |
| JP | 2012-513533 | A | 6/2012 | |
| JP | 2014-237842 | A | 12/2014 | |
| JP | 2019-524968 | A | 9/2019 | |
| WO | WO-2005007709 | A1 * | 1/2005 | C08F 14/18 |
| WO | 2005/033150 | A1 | 4/2005 | |
| WO | 2009/020187 | A1 | 2/2009 | |
| WO | 2010/075495 | A1 | 7/2010 | |
| WO | 2010/113950 | A1 | 10/2010 | |
| WO | 2012/088258 | A1 | 6/2012 | |
| WO | 2019/215636 | A1 | 11/2019 | |
| WO | 2020/071505 | A1 | 4/2020 | |

OTHER PUBLICATIONS

CN-104403036-A (Mar. 11, 2015); machine translation. (Year: 2015).*
International Preliminary Report on Patentability dated Jul. 31, 2023 in Application No. PCT/JP2022/003337.
Extended European Search Report issued Jan. 14, 2025 in Application No. 22746034.2.
International Search Report of PCT/JP2022/003337 dated Apr. 12, 2022 [PCT/ISA/210].

* cited by examiner

*Primary Examiner* — Rip A Lee
(74) *Attorney, Agent, or Firm* — Sughrue Mion, PLLC

(57) ABSTRACT

A fluoropolymer composition production method for producing a fluoropolymer composition containing a fluoropolymer, the method which includes polymerizing a fluoromonomer in a reactor in the presence of a fluorine-containing surfactant, a polymerization initiator, and an aqueous medium to prepare an aqueous dispersion comprising a fluoropolymer; feeding an inert gas to the reactor; and subjecting to a heat treatment the aqueous dispersion in the reactor to give a fluoropolymer composition, wherein a temperature of the heat treatment is 35 °C or higher and a time of the heat treatment is 15 minutes or more.

16 Claims, No Drawings

METHOD FOR PRODUCING FLUOROPOLYMER COMPOSITION

CROSS-REFERENCE TO RELATED APPLICATIONS

This application is a Rule 53(b) Continuation of International Application No. PCT/JP2022/003337 filed Jan. 28, 2022, which claims priority based on Japanese Patent Application No. 2021-012507 filed Jan. 28, 2021, the respective disclosures of which are incorporated herein by reference in their entirety.

TECHNICAL FIELD

The present disclosure relates to a method for producing a fluoropolymer composition.

BACKGROUND ART

A known method for producing a fluoropolymer is a method involving emulsion-polymerizing a fluoromonomer. An aqueous dispersion of a fluoropolymer obtained by emulsion polymerization contains components other than the fluoropolymer, such as a surfactant used in emulsion polymerization. Various studies have been carried out on methods for reducing or removing such components other than the fluoropolymer.

Patent Literature 1 discloses a process for reducing the content of fluoroether carboxylic acid or salt in an aqueous fluoropolymer dispersion, the fluoroether carboxylic acid or salt having the formula:

$$[R^1—O—L—COO^-]Y^+$$

wherein:

- $R^1$ is a linear, branched or cyclic partially or fully fluorinated aliphatic group optionally containing an ether bond;
- L is a branched partially or fully fluorinated alkylene group optionally containing an ether bond; and
- $Y^+$ is a cation of hydrogen, ammonium or alkali metal; the process comprising:
- adding a stabilizer to the aqueous fluoropolymer dispersion to form a stabilized aqueous fluoropolymer dispersion;
- heating the stabilized aqueous fluoropolymer dispersion for decarboxylation of the fluoroether carboxylic acid or salt to produce a fluoroether byproduct; and
- removing at least a portion of the fluoroether byproduct.

CITATION LIST

Patent Literature

Patent Literature 1: Japanese Patent Laid-Open No. 2014-237842

SUMMARY

The present disclosure provides a fluoropolymer composition production method for producing a fluoropolymer composition comprising a fluoropolymer, the method comprising polymerizing a fluoromonomer in a reactor in the presence of a fluorine-containing surfactant, a polymerization initiator, and an aqueous medium to prepare an aqueous dispersion comprising a fluoropolymer; feeding an inert gas to the reactor; and subjecting to a heat treatment the aqueous dispersion in the reactor to give a fluoropolymer composition.

Effects

The present disclosure can provide a production method capable of producing at high productivity a fluoropolymer composition in which the content of a fluorine-containing surfactant used when polymerizing a fluoromonomer and the content of a fluorine-containing compound produced by polymerization of the fluoromonomer are reduced.

DESCRIPTION OF EMBODIMENTS

Hereinafter, specific embodiments of the present disclosure will now be described in detail, but the present disclosure is not limited to the following embodiments.

The present disclosure relates to a fluoropolymer composition production method for producing a fluoropolymer composition containing at least a fluoropolymer. In the production method of the present disclosure, a fluoropolymer composition is obtained by polymerizing a fluoromonomer in a reactor in the presence of a fluorine-containing surfactant, a polymerization initiator, and an aqueous medium to prepare an aqueous dispersion containing a fluoropolymer; after the aqueous dispersion containing the fluoropolymer is prepared, feeding an inert gas to the reactor; and subjecting to a heat treatment the aqueous dispersion in the reactor.

An aqueous dispersion obtained by polymerizing a fluoromonomer may contain, other than the fluoropolymer, a fluorine-containing surfactant and a fluorine-containing compound that is produced by polymerization of the fluoromonomer. In the production method of the present disclosure, after an aqueous dispersion is prepared by polymerizing a fluoromonomer, an inert gas is fed to the reactor, and, moreover, the aqueous dispersion in the reactor is heat-treated. Thus, after the aqueous dispersion is prepared, an inert gas is fed to the reactor to terminate the polymerization of the fluoromonomer, then the aqueous dispersion is heat-treated in the reactor, thereby the fluorine-containing surfactant and the fluorine-containing compound are decomposed in the aqueous dispersion, enabling a fluoropolymer composition to be produced in which the content of the fluorine-containing surfactant and the content of the fluorine-containing compound are reduced. Moreover, according to the production method of the present disclosure, all steps are performed in the same reactor, thus all steps can be easily performed without requiring complex operations, and, accordingly, a fluoropolymer composition can be produced at high productivity.

In the production method of the present disclosure, first a fluoromonomer is polymerized in a reactor in the presence of a fluorine-containing surfactant, a polymerization initiator, and an aqueous medium to prepare an aqueous dispersion containing a fluoropolymer.

The polymerization of a fluoromonomer can be performed by charging a reactor with a fluoromonomer, a fluorine-containing surfactant, a polymerization initiator, an aqueous medium, and optionally other additives, stirring the contents of the reactor, retaining the reactor at a predetermined polymerization temperature, and then adding a predetermined amount of a polymerization initiator to initiate the polymerization reaction. After the polymerization reaction is initiated, the fluoromonomer, the polymerization initiator, the fluorine-containing surfactant, and a chain transfer agent may be further added depending on the purpose. The method for polymerizing the fluoromonomer is not limited, may be an emulsion polymerization method or a suspension polymerization method, and is preferably an emulsion polymerization method.

(Fluorine-Containing Surfactant)

The fluorine-containing surfactant used in the polymerization of the fluoromonomer is not limited as long as it is a surfactant containing at least one fluorine atom, and conventionally known fluorine-containing surfactants can be used.

Examples of the fluorine-containing surfactant include anionic fluorine-containing surfactants. The anionic fluorine-containing surfactant may be, for example, a fluorine atom-containing surfactant having 20 or fewer carbon atoms in total in the portion excluding the anionic group.

The fluorine-containing surfactant may also be a fluorine-containing surfactant in which the molecular weight of the anionic moiety is 1,000 or less.

The "anionic moiety" means the portion of the fluorine-containing surfactant excluding the cation. For example, in the case of $F(CF_2)_{n1}COOM$ represented by the formula (I) described below, the anionic moiety is the "$F(CF_2)_{n1}COO$" portion.

Examples of the fluorine-containing surfactant include fluorine-containing surfactants having a Log POW of 3.5 or less. The Log POW is a partition coefficient between 1-octanol and water, which is represented by Log P (wherein P is the ratio between the concentration of the fluorine-containing surfactant in octanol and the concentration of the fluorine-containing surfactant in water in a phase-separated octanol/water (1:1) liquid mixture containing the fluorine-containing surfactant).

The Log POW is calculated by performing HPLC on standard substances (heptanoic acid, octanoic acid, nonanoic acid, and decanoic acid) having a known octanol/water partition coefficient under conditions having column: TOSOH ODS-120T column (φ4.6 mm×250 mm, manufactured by Tosoh Corporation), eluent: acetonitrile/0.6 mass % $HClO_4$ aqueous solution=1/1 (vol/vol %), flow rate: 1.0 ml/min, sample volume: 300 μL, column temperature: 40 °C, detection light: UV210 nm to construct a calibration curve concerning each elution time and known octanol/water partition coefficient, and determining the HPLC elution time of a sample liquid based on the calibration curve.

Specific examples of the fluorine-containing surfactant include those described in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO 2007/046377, Japanese Patent Laid-Open No. 2007-119526, International Publication No. WO 2007/046482, International Publication No. WO2007/046345, U.S. Patent Application Publication No. 2014/0228531, International Publication No. WO 2013/189824, and International Publication No. WO 2013/189826.

The anionic fluorine-containing surfactant may be a compound represented by the following general formula)($N^0$):

$$X^{n0}—Rf^{n0}—Y^0 \quad (N^0)$$

wherein $X^{n0}$ is H, Cl, or F; $Rf^{n0}$ is a linear, branched, or cyclic alkylene group having 3 to 20 carbon atoms in which some or all of H are replaced by F, the alkylene group optionally containing one or more ether bonds in which some of H are optionally replaced by Cl; and $Y^0$ is an anionic group.

The anionic group $Y^0$ may be —COOM, —$SO_2M$, or —$SO_3M$, and may be —COOM or —$SO_3M$.

M is H, a metal atom, $NR_4^7$, optionally substituted imidazolium, optionally substituted pyridinium, or optionally substituted phosphonium, and $R^7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR_4^7$, may be H, an alkali metal (Group 1), an alkaline earth metal (Group 2), or $NR_4^7$, and may be H, Na, K, Li, or $NH_4$.

In $Rf^{n0}$, 50% or more of H may be replaced with fluorine.

Examples of the compound represented by general formula)($N^0$) include a compound represented by the following general formula ($N^1$):

$$X^{n0}—(CF_2)_{m1}—Y^0 \quad (N^1)$$

(wherein $X^{n0}$ is H, Cl, or F, m1 is an integer of 3 to 15, and $Y^0$ is as defined above); a compound represented by the following general formula ($N^2$):

$$Rf^{n1}—O—(CF(CF_3)CF_2O)_{m2}CFX^{n1}—Y^0 \quad (N^2)$$

(wherein $Rf^{n1}$ is a perfluoroalkyl group having 1 to 5 carbon atoms, m2 is an integer of 0 to 3, $X^{n1}$ is F or $CF_3$, and $Y^0$ is as defined above); a compound represented by the following general formula ($N^3$):

$$Rf^{n2}(CH_2)_{m3}—(Rf^{n3})_q—Y^0 \quad (N^3)$$

(wherein $Rf^{n2}$ is a partially or fully fluorinated alkyl group having 1 to 13 carbon atoms and optionally containing an ether bond and/or a chlorine atom, m3 is an integer of 1 to 3, $Rf^{n3}$ is a linear or branched perfluoroalkylene group having 1 to 3 carbon atoms, q is 0 or 1, and $Y^0$ is as defined above); a compound represented by the following general formula ($N^4$):

$$Rf^{n4}—O—(CY^{n1}Y^{n2})_pCF_2—Y^0 \quad (N^4)$$

(wherein $Rf^{n4}$ is a linear or branched, partially or fully fluorinated alkyl group having 1 to 12 carbon atoms and optionally containing an ether bond, $Y^{n1}$ and $Y^{n2}$ are the same or different and are each independently H or F, p is 0 or 1, and $Y^0$ is as defined above); and a compound represented by the following general formula ($N^5$):

(N⁵)

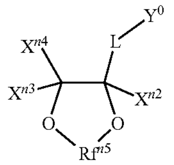

(wherein $X^{n2}$, $X^{n3}$, and $X^{n4}$ may be the same or different and are each independently H, F, or a linear or branched, partially or fully fluorinated alkyl group having 1 to 6 carbon atoms and optionally containing an ether bond, $Rf^{n5}$ is a linear or branched, partially or fully fluorinated alkylene group having 1 to 3 carbon atoms and optionally containing an ether bond, L is a linking group, and $Y^0$ is as defined above, provided that the total number of carbon atoms of $X^{n2}$, $X^{n3}$, $X^{n4}$, and $Rf^{n5}$ is 18 or less).

More specific examples of the compound represented by the above general formula)($N^0$ include a perfluorocarboxylic acid (I) represented by the following general formula (I), an ω—H perfluorocarboxylic acid (II) represented by the following general formula (II), a perfluoroethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω—H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) is represented by the following general formula (I):

$$F(CF_2)_{n1}COOM \quad (I)$$

wherein n1 is an integer of 3 to 14, M is H, a metal atom, $NR_4^7$, optionally substituted imidazolium, optionally substituted pyridinium, or optionally substituted phosphonium, and $R^7$ is H or an organic group.

The ω—H perfluorocarboxylic acid (II) is represented by the following general formula (II):

$$H(CF_2)_{n2}COOM \quad (II)$$

wherein n2 is an integer of 4 to 15; and M is as defined above.

The perfluoroethercarboxylic acid (III) is represented by the following general formula (III):

$$Rf^1—O—(CF(CF_3)CF_2O)_{n3}CF(CF_3)COOM \quad (III)$$

wherein $Rf^1$ is a perfluoroalkyl group having 1 to 5 carbon atoms, n3 is an integer of 0 to 3, and M is as defined above.

The perfluoroalkylalkylenecarboxylic acid (IV) is represented by the following general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4—O—CY^1Y^2CF_2—COOM \quad (V)$$

wherein $Rf^4$ is a linear or branched partially or fully fluorinated alkyl group having 1 to 12 carbon atoms and optionally containing an ether bond and/or a chlorine atom; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \quad (VI)$$

wherein n5 is an integer of 3 to 14, and M is as defined above.

The ω—H perfluorosulfonic acid (VII) is represented by the following general formula (VII):

$$H(CF_2)_{n6}SO_3M \quad (VII)$$

wherein n6 is an integer of 4 to 14, and M is as defined above.

The perfluoroalkylalkylenesulfonic acid (VIII) is represented by the following general formula (VIII):

$$Rf^5(CH_2)_{n7}SO_3M \quad (VIII)$$

wherein $Rf^5$ is a perfluoroalkyl group having 1 to 13 carbon atoms, n7 is an integer of 1 to 3, and M is as defined above.

The alkylalkylenecarboxylic acid (IX) is represented by the following general formula (IX):

$$Rf^6(CH_2)_{n8}COOM \quad (IX)$$

wherein $Rf^6$ is a linear or branched, partially or fully fluorinated alkyl group having 1 to 13 carbon atoms and optionally containing an ether bond, n8 is an integer of 1 to 3, and M is as defined above.

The fluorocarboxylic acid (X) is represented by the following general formula (X):

$$Rf^7—O—Rf^8—O—CF_2—COOM \quad (X)$$

wherein $Rf^7$ is a linear or branched partially or fully fluorinated alkyl group having 1 to 6 carbon atoms and optionally containing an ether bond and/or a chlorine atom; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9—O—CY^1Y^2CF_2—SO_3M \quad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

(XII)

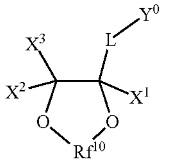

wherein $X^1$, $X^2$, and $X^3$ may be the same or different and are each independently H, F, or a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —$SO_2M$, or —$SO_3M$, and may be-$SO_3M$ or COOM, wherein M is as defined above.

Examples of L include a single bond, and a partially or fully fluorinated alkylene group having 1 to 10 carbon atoms and optionally containing an ether bond.

The compound (XIII) is represented by the following general formula (XIII):

$$Rf^{11}—O—(CF_2CF(CF_3)O)_{n9}(CF_2O)_{n10}CF_2COOM \quad (XIII)$$

wherein $Rf^{11}$ is a fluoroalkyl group having 1 to 5 carbon atoms containing chlorine, n9 is an integer of 0 to 3, n10 is an integer of 0 to 3, and M is as defined above. Examples of the compound (XIII) include $CF_2C_{10}$ $(CF_2CF\ (CF_3)O)_{n9}$ $(CF_2O)_{n10}CF_2COONH_4$ (a mixture having an average molecular weight of 750, n9 and n10 in the formula are as defined above).

As described above, examples of the anionic fluorine-containing surfactant include a carboxylic acid-based surfactant and a sulfonic acid-based surfactant.

The fluorine-containing surfactant may be one fluorine-containing surfactant, or may be a mixture containing two or more fluorine-containing surfactants.

The fluorine-containing surfactant preferably does not have a methylene group (—$CH_2$—), and more preferably does not have a C—H bond. The use of a fluorine-containing surfactant that does not have a methylene group (—$CH_2$—) or a C—H bond within the molecule enables the fluoromonomer to be smoothly polymerized in the presence of an aqueous medium.

The number of H atoms that the hydrophobic group of the fluorine-containing surfactant has is preferably 0 or 1, and more preferably 0. The use of a fluorine-containing surfactant in which the number of H atoms bonded to carbon atoms constituting the hydrophobic group is small enables the fluoromonomer to be smoothly polymerized in the presence of an aqueous medium. The number of carbon atoms in the hydrophobic group of the fluorine-containing surfactant having a hydrophobic group and a hydrophilic group is preferably 1 to 50, more preferably 3 to 20, and even more preferably 6 to 12. The hydrophobic group usually constitutes the above-described "portion excluding the anionic group" in the molecular structure of the fluorine-containing surfactant. Examples of the hydrophilic group include groups exemplified as the anionic group Y°. The fluorine-containing surfactant may be a saturated fluorinated surfactant in which all carbon atoms bonded to the hydrophobic group are substituted with fluorine atoms.

Examples of fluorine-containing surfactants, among the above-described anionic fluorine-containing surfactants, include compounds represented by general formula (N1), compounds represented by general formula (N2), and compounds represented by general formula (N4):

$$Rf^{n4}—O—(CY^{n1}F)_pCF_2—Y^0 \quad (N^4)$$

wherein $Rf^{n4}$ is a linear or branched, partially or fully fluorinated alkyl group having 1 to 12 carbon atoms and optionally containing an ether bond (provided that those having —$CH_2$— are excluded), $Y^{n1}$ is H or F, p is 0 or 1, and $Y^0$ is as defined above; and compounds represented by general formula ($N^5$):

($N^5$)

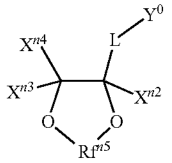

wherein $X^{n2}$, $X^{n3}$, and $X^{n4}$ may be the same or different and are each independently H, F, or a linear or branched, partially or fully fluorinated alkyl group having 1 to 6 carbon atoms and optionally containing an ether bond (provided that those having —$CH_2$— are excluded), provided that $X^{n3}$ and $X^{n4}$ are not simultaneously H; $Rf^{n5}$ is a linear or branched, partially or fully fluorinated alkylene group having 1 to 3 carbon atoms and optionally containing an ether bond (provided that those having —$CH_2$— are excluded); L is a linking group; and $Y^0$ is as defined above, provided that the total number of carbon atoms of $X^{n2}$, $X^{n3}$, $X^{n4}$, and $Rf^{n5}$ is 18 or less.

Among the above-described anionic fluorine-containing surfactants, the fluorine-containing surfactant is preferably at least one selected from the group consisting of perfluorocarboxylic acid (I) represented by general formula (I), ω—H perfluorocarboxylic acid (II) represented by general formula (II), perfluoroethercarboxylic acid (III) represented by general formula (III), perfluoroalkylalkylenecarboxylic acid (IV) represented by general formula (IV), perfluoroalkoxyfluorocarboxylic acid (V) represented by general formula (V), perfluoroalkylsulfonic acid (VI) represented by general formula (VI), ω—H perfluorosulfonic acid (VII) represented by general formula (VII), perfluoroalkylalkylenesulfonic acid (VIII) represented by general formula (VIII), fluorocarboxylic acid (X) represented by general formula (X): $Rf^7—O—Rf^8—O—CF_2—COOM$ (wherein $Rf^7$ is a linear or branched, partially or fully fluorinated alkyl group having 1 to 6 carbon atoms and optionally containing an ether bond and/or a chlorine atom (provided that those having $—CH_2—$ are excluded), $Rf^8$ is a linear or branched, partially or fully fluorinated alkyl group having 1 to 6 carbon atoms (provided that those having $—CH_2—$ are excluded), and M is as defined above), an alkoxyfluorosulfonic acid (XI) represented by general formula (XI): $Rf^9—O—CY^1FCF_2—SO_3M$ (wherein $Rf^9$ is a linear or branched, partially or fully fluorinated alkyl group having 1 to 12 carbon atoms, optionally containing an ether bond, and optionally containing chlorine (provided that those having $—CH_2—$ are excluded), $Y^1$ is H or F, and M is as defined above), a compound (XII) represented by general formula (XII), (XII)

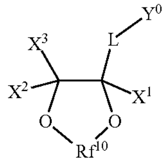

(wherein $X^1$, $X^2$, and $X^3$ may be the same or different and are each independently H, F, and a linear or branched, partially or fully fluorinated alkyl group having 1 to 6 carbon atoms and optionally containing an ether bond (provided that those having $—CH_2—$ are excluded), provided that $X^2$ and $X^3$ are not simultaneously H, $Rf^{10}$ is a perfluoroalkylene group having 1 to 3 carbon atoms, L is a linking group, and $Y^0$ is an anionic group), and a compound (XIII) represented by general formula (XIII): $Rf^{11}—O—(CF_2CF(CF_3)O)_{n9}(CF_2O)_{n10}CF_2COOM$ (wherein $Rf^{11}$ is a fluoroalkyl group having 1 to 5 carbon atoms containing chlorine (provided that those having $—CH_2—$ are excluded), n9 is an integer of 0 to 3, n10 is an integer of 0 to 3, and M is as defined above). The use of such a fluorine-containing surfactant enables the fluoromonomer to be smoothly polymerized in the presence of an aqueous medium.

Examples of the fluorine-containing surfactant include compounds represented by the following formulae. The fluorine-containing surfactant may be a mixture of these compounds.

$F(CF_2)_7COOM$,
$F(CF_2)_5COOM$,
$H(CF_2)_6COOM$,
$H(CF_2)_7COOM$;
$CF_3O(CF_2)_3OCHFCF_2COOM$,
$C_3F_7OCF(CF_3)CF_2OCF(CF_3)COOM$,
$CF_3CF_2CF_2OCF(CF_3)COOM$,
$CF_3CF_2OCF_2CF_2OCF_2COOM$,
$C_2F_5OCF(CF_3)CF_2OCF(CF_3)COOM$,
$CF_3OCF(CF_3)CF_2OCF(CF_3)COOM$,
$CF_2C_1CF_2CF_2OCF(CF_3)CF_2OCF_2COOM$,
$CF_2C_1CF_2CF_2OCF_2CF(CF_3)OCF_2COOM$,
$CF_2C_1CF(CF_3)OCF(CF_3)CF_2OCF_2COOM$, and
$CF_2C_1CF(CF_3)OCF_2CF(CF_3)OCF_2COOM$,

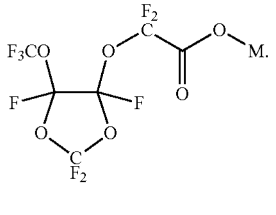

wherein M is H, a metal atom, $NR_4^7$, optionally substituted imidazolium, optionally substituted pyridinium, or optionally substituted phosphonium.

The amount of the fluorine-containing surfactant added is preferably 10 mass ppm to 10% by mass, more preferably 100 mass ppm or more, and even more preferably 300 mass ppm or more, and is more preferably 5% by mass or less and even more preferably 1% by mass or less, based on the aqueous medium.

(Polymerization Initiator)

The polymerization initiator used in the polymerization of the fluoromonomer is not limited as long as it is a polymerization initiator capable of generating radicals within the polymerization temperature range, and known oil-soluble and/or water-soluble polymerization initiators can be used. The polymerization initiator can be combined with a reducing agent or the like to form a redox agent and initiate polymerization. The concentration of the polymerization initiator is suitably determined according to the type of monomer, the molecular weight of the target fluoropolymer, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl]peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)

peroxide, and di(undecachlorodotoriacontafluorodocosanoyl)peroxide.

The water-soluble radical polymerization initiator may be a known water-soluble peroxide, and examples include ammonium salts, potassium salts, and sodium salts of persulfuric acid, perboric acid, perchloric acid, perphosphoric acid, and percarbonic acid, organic peroxides such as disuccinic acid peroxide and diglutaric acid peroxide, t-butyl permaleate, and t-butyl hydroperoxide. A reducing agent such as a sulfite may be contained together, and the amount thereof may be 0.1 to 20 times the amount of the peroxide.

For example, when performing the polymerization at a low temperature of 30 °C or lower, the polymerization initiator used is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfite, bisulfite, bromate, diimine, and oxalic acid. Examples of persulfates include ammonium persulfate and potassium persulfate. Examples of sulfites include sodium sulfite and ammonium sulfite. In order to increase the decomposition rate of the initiator, the combination of the redox initiator preferably contains a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron sulfate, manganese triacetate/oxalic acid, cerium ammonium nitrate/oxalic acid, and bromate/bisulfite, and potassium permanganate/oxalic acid is preferable. When using a redox initiator, one of an oxidizing agent and a reducing agent may be introduced into a polymerization tank in advance, and then the other may be added continuously or intermittently to initiate polymerization. For example, when using potassium permanganate/oxalic acid, preferably, a polymerization tank is charged with oxalic acid, and potassium permanganate is continuously added thereto.

The amount of the polymerization initiator added is not limited, and the polymerization initiator is added in an amount that does not significantly decrease the polymerization rate (e.g., a concentration of several ppm in water) or more at once in the initial stage of polymerization, or added successively or continuously. The upper limit is within a range where the reaction temperature is allowed to increase while the polymerization reaction heat is removed through the device surface, and the upper limit is more preferably within a range where the polymerization reaction heat can be removed through the device surface.

The amount of the polymerization initiator added is preferably such that the polymerization initiator remains in the fluoropolymer-containing aqueous dispersion without being entirely consumed in the polymerization of the fluoromonomer. The amount of the polymerization initiator added is preferably 5 mass ppm or more, more preferably 10 mass ppm or more, even more preferably 20 mass ppm or more, and particularly preferably 50 mass ppm or more, based on the mass of the aqueous medium. The amount of the polymerization initiator at the end of polymerization can be calculated from the polymerization temperature, the reaction time, and the half-life of the initiator. The concentration of the polymerization initiator at the end of polymerization is preferably 5 mass ppm or more, more preferably 10 mass ppm or more, even more preferably 20 mass ppm or more, and particularly preferably 50 mass ppm or more, based on the mass of the aqueous medium.

By adding a decomposer when polymerizing the fluoromonomer, the concentration of radicals during polymerization can be regulated. Examples of the decomposer include sulfites, bisulfites, bromates, diimines, oxalic acid, copper salts, and iron salts. Examples of sulfites include sodium sulfite and ammonium sulfite. The copper salt may be copper(II) sulfate, and the iron salt may be iron(II) sulfate. The amount of the decomposer added is in the range of 25 to 300% by mass based on the amount of the oxidizing agent combined as a polymerization initiator (a redox initiator). The amount of the decomposer added is preferably 25 to 150% by mass, and more preferably 50 to 100% by mass. The decomposer is preferably added after 5% by mass of all fluoromonomer to be consumed in the polymerization reaction is polymerized, and more preferably added after 10% by mass is polymerized. The amount of the decomposer added is preferably an amount corresponding to 0.1 to 20 mass ppm and more preferably an amount corresponding to 3 to 10 mass ppm of the mass of the aqueous medium used.

(Aqueous Medium)

The aqueous medium for use in the polymerization of the fluoromonomer is a reaction medium in which the polymerization is performed, and means a liquid containing water. The aqueous medium is not limited as long as it contains water, and may be an aqueous medium containing water and, for example, a fluorine-free organic solvent such as ether or ketone, and/or a fluorine-containing organic solvent having a boiling point of 40 °C or lower.

The aqueous medium is preferably an aqueous medium solely containing water or an aqueous medium solely containing water and a fluorine-free organic solvent, and is more preferably an aqueous medium solely containing water, because the polymerization of the fluoromonomer can proceed smoothly and, also, deterioration of the efficiency of removing the fluorine-containing surfactant and the fluorine-containing compound by heat treatment after preparing the aqueous dispersion can be suppressed.

The water content in the aqueous medium is preferably 90% or more, more preferably 95% or more, even more preferably 99.0% or more, yet more preferably 99.5% or more, and particularly preferably 99.9% or more, and may be 100% based on the mass of the aqueous medium because the polymerization of the fluoromonomer can proceed smoothly and, also, deterioration of the efficiency of removing the fluorine-containing surfactant and the fluorine-containing compound by heat treatment after preparing the aqueous dispersion can be suppressed.

(Fluoromonomer)

The fluoromonomer for use in polymerization has at least one fluorine atom and at least one double bond. The fluoromonomer is preferably at least one selected from the group consisting of tetrafluoroethylene (TFE), hexafluoropropylene (HFP), chlorotrifluoroethylene (CTFE), vinyl fluoride, vinylidene fluoride (VdF), trifluoroethylene, fluoroalkyl vinyl ether, fluoroalkyl ethylene, fluoroalkyl allyl ether, trifluoropropylene, pentafluoropropylene, trifluorobutene, tetrafluoroisobutene, hexafluoroisobutene, a fluoromonomer represented by general formula (100): $CHX^{101}{=}CX^{102}Rf^{101}$ (wherein one of $X^{101}$ and $X^{102}$ is H, the other is F, and $Rf^{101}$ is a linear or branched fluoroalkyl group having 1 to 12 carbon atoms), a fluorinated vinyl heterocyclic compound, and a monomer that provides a crosslinking site.

Fluoroalkyl vinyl ether (FAVE) is preferably, for example, at least one selected from the group consisting of:

a fluoromonomer represented by general formula (110):

$CF_2{=}CF{-}ORf^{111}$ wherein $Rf^{111}$ represents a perfluoro organic group;

a fluoromonomer represented by general formula (120):

$CF_2{=}CF{-}OCH_2\text{-}Rf^{121}$ wherein $Rf^{121}$ is a perfluoroalkyl group having 1 to 5 carbon atoms;

a fluoromonomer represented by general formula (130):

$CF_2{=}CFOCF_2ORf^{131}$ wherein $Rf^{131}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms;

a fluoromonomer represented by general formula (140):

$CF_2{=}CFO(CF_2CF(Y^{141})O)_m(CF_2)_nF$ wherein $Y^{141}$ represents a fluorine atom or a trifluoromethyl group; m is an integer of 1 to 4; and n is an integer of 1 to 4; and a fluoromonomer represented by general formula (150):

$CF_2{=}CF{-}O{-}(CF_2CFY^{151}{-}O)_n{-}(CFY^{152})_m\text{-}A^{151}$ wherein $Y^{151}$ represents fluorine atom, chlorine atom, $-SO_2F$ group, or a perfluoroalkyl group; the perfluoroalkyl group optionally contains ether oxygen or $-SO_2F$ group; n represents an integer of 0 to 3; n $Y^{151}-$ groups are the same or different; $Y^{152}$ represents fluorine atom, chlorine atom, or $-SO_2F$ group; m represents an integer of 1 to 5; m $Y^{152}$ groups are the same or different; $A^{151}$ represents $-SO_2X^{151}$, $-COZ^{151}$, or $-POZ^{152}Z^{153}$; $X^{151}$ represents F, Cl, Br, I, $-OR^{151}$, or $-NR^{152}R^{153}$; $Z^{151}$, $Z^{152}$, and $Z^{153}$ are the same or different, and each independently represent $-NR^{154}R^{155}$ or $-OR^{156}$; and $R^{151}$, $R^{152}$, $R^{153}$, $R^{154}$, $R^{155}$ and $R^{156}$ are the same or different, and each independently represent H, ammonium, an alkali metal, or an alkyl group, an aryl group, or a sulfonyl-containing group optionally containing fluorine atom.

The "perfluoro organic group" as used herein means an organic group in which all hydrogen atoms bonded to the carbon atoms are replaced with fluorine atoms. The perfluoro organic group may have ether oxygen.

An example of the fluoromonomer represented by general formula (110) is a fluoromonomer in which $Rf^{111}$ is a perfluoroalkyl group having 1 to 10 carbon atoms. The perfluoroalkyl group preferably has 1 to 5 carbon atoms.

Examples of the perfluoro organic group in general formula (110) include a perfluoromethyl group, a perfluoroethyl group, a perfluoropropyl group, a perfluorobutyl group, a perfluoropentyl group, and a perfluorohexyl group.

Examples of the fluoromonomer represented by general formula (110) also include those represented by general formula (110) in which $Rf^{111}$ is a perfluoro(alkoxyalkyl) group having 4 to 9 carbon atoms; those in which $Rf^{111}$ is a group represented by the following formula:

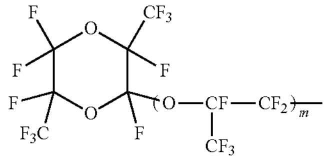

wherein m represents 0 or an integer of 1 to 4; and those in which $Rf^{111}$ is a group represented by the following formula:

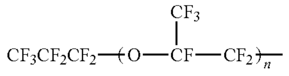

wherein n represents an integer of 1 to 4.

Of these, the fluoromonomer represented by general formula (110) is preferably a fluoromonomer represented by general formula (160):

$CF_2{=}CF{-}ORf^{161}$ wherein $Rf^{161}$ represents a perfluoroalkyl group having 1 to 10 carbon atoms. $Rf^{161}$ is preferably a perfluoroalkyl group having 1 to 5 carbon atoms.

Fluoroalkyl vinyl ether is preferably at least one selected from the group consisting of fluoromonomers represented by general formulae (160), (130), and (140).

The fluoromonomer represented by general formula (160) is preferably at least one selected from the group consisting of perfluoro(methyl vinyl ether), perfluoro(ethyl vinyl ether), and perfluoro(propyl vinyl ether), and is more preferably at least one selected from the group consisting of perfluoro(methyl vinyl ether) and perfluoro(propyl vinyl ether).

The fluoromonomer represented by general formula (130) is preferably at least one selected from the group consisting of $CF_2{=}CFOCF_2OCF_3$, $CF_2{=}CFOCF_2OCF_2CF_3$, and $CF_2{=}CFOCF_2OCF_2CF_2OCF_3$.

The fluoromonomer represented by general formula (140) is preferably at least one selected from the group consisting of $CF_2{=}CFOCF_2CF\ (CF_3)O(CF_2)_3F$, $CF_2{=}CFO(CF_2CF(CF_3)O)_2(CF_2)_3F$, and $CF_2{=}CFO(CF_2CF\ (CF_3)O)\ 2\ (CF_2)\ 2F$.

The fluoromonomer represented by general formula (150) is preferably at least one selected from the group consisting of $CF_2{=}CFOCF_2CF_2SO_2F$, $CF_2{=}CFOCF_2CF\ (CF_3)OCF_2CF_2SO_2F$, $CF_2{=}CFOCF_2CF\ (CF_2CF_2SO_2F)OCF_2CF_2SO_2F$, and $CF_2{=}CFOCF_2CF(SO_2F)\ _2$.

The fluoromonomer represented by general formula (100) is preferably a fluoromonomer in which $Rf^{101}$ is a linear fluoroalkyl group, and more preferably a fluoromonomer in which $Rf^{101}$ is a linear perfluoroalkyl group. $Rf^{101}$ preferably has 1 to 6 carbon atoms. Examples of the fluoromonomer represented by general formula (100) include $CH_2{=}CFCF_3$, $CH_2{=}CFCF_2CF_3$, $CH_2{=}CFCF_2CF_2CF_3$, $CH_2{=}CFCF_2CF_2CF_2H$, $CH_2{=}CFCF_2CF_2CF_2CF_3$, $CHF{=}CHCF_3$ (E isomer), and $CHF{=}CHCF_3$ (Z isomer), and, in particular, 2,3,3,3-tetrafluoropropylene represented by $CH_2{=}CFCF_3$ is preferable.

Fluoroalkyl ethylene is preferably a fluoroalkyl ethylene represented by $CH_2{=}CH{-}(CF_2)n\text{-}X^{171}$ general formula (170)

(wherein $X^{171}$ is H or F; and n is an integer of 3 to 10), and more preferably at least one selected from the group consisting of $CH_2{=}CH{-}C_4F_9$ and $CH_2{=}CH{-}C_6F_{13}$.

An example of the fluoroalkyl allyl ether is a fluoromonomer represented by $CF_2{=}CF{-}CF_2{-}ORf^{111}$ general formula (180)

wherein $Rf^{111}$ represents a perfluoro organic group.

$Rf^{111}$ in general formula (180) is the same as $Rf^{111}$ in general formula (110). $Rf^{111}$ is preferably a perfluoroalkyl group having 1 to 10 carbon atoms or a perfluoroalkoxyalkyl group having 1 to 10 carbon atoms. The fluoroalkyl allyl ether represented by general formula (180) is preferably at least one selected from the group consisting of $CF_2{=}CF{-}CF_2{-}O{-}CF_3$, $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, more preferably at least one selected from the group consisting of $CF_2{=}CF{-}CF_2{-}O{-}C_2F_5$, $CF_2{=}CF{-}CF_2{-}O{-}C_3F_7$, and $CF_2{=}CF{-}CF_2{-}O{-}C_4F_9$, and even more preferably $CF_2{=}CF{-}CF_2{-}O{-}CF_2CF_2CF_3$.

An example of the fluorinated vinyl heterocyclic compound is a fluorinated vinyl heterocyclic compound represented by general formula (230):

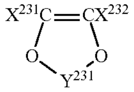

wherein $X^{231}$ and $X^{232}$ are each independently F, Cl, a methoxy group, or a fluorinated methoxy group; and $Y^{231}$ is represented by formula $Y^{232}$ or formula $Y^{233}$:

$$-FC{=}CF- \quad (Y^{232})$$

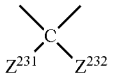

$(Y^{233})$ wherein 2231 and 2232 are each independently F or a fluorinated alkyl group having 1 to 3 carbon atoms.

The monomer that provides a crosslinking site is preferably at least one selected from the group consisting of:

a fluoromonomer represented by general formula (180):

$$CX_2^{181}{=}CX^{182}{-}R_f^{181}CHR^{181}X^{183}$$

wherein $X^{181}$ and $X^{182}$ are each independently a hydrogen atom, a fluorine atom, or $CH_3$; $Rf^{181}$ is a fluoroalkylene group, a perfluoroalkylene group, a fluoro(poly)oxyalkylene group, or a perfluoro(poly)oxyalkylene group; $R^{181}$ is a hydrogen atom or $CH_3$; and $X^{183}$ is an iodine atom or a bromine atom;

a fluoromonomer represented by general formula (190):

$$CX_2^{191}{=}CX^{192}{-}R_f^{191}X^{193}$$

wherein $X^{191}$ and $X^{192}$ are each independently a hydrogen atom, a fluorine atom, or $CH_3$; $Rf^{191}$ is a fluoroalkylene group, a perfluoroalkylene group, a fluoropolyoxyalkylene group, or a perfluoropolyoxyalkylene group; and $X^{193}$ is an iodine atom or a bromine atom;

a fluoromonomer represented by general formula (200):

$$CF_2{=}CFO(CF_2CF(CF_3)O)_m(CF_2)_n{-}X^{201}$$

wherein m is an integer of 0 to 5; n is an integer of 1 to 3; and $X^{201}$ is a cyano group, a carboxyl group, an alkoxycarbonyl group, an iodine atom, a bromine atom, or $-CH_2I$; and a fluoromonomer represented by general formula (210):

$$CH_2{=}CFCF_2O(CF(CF_3)CF_2O)_m(CF(CF_3))_n{-}X^{211}$$

wherein m is an integer of 0 to 5; n is an integer of 1 to 3; and $X^{211}$ is a cyano group, a carboxyl group, an alkoxycarbonyl group, an iodine atom, a bromine atom, or $-CH_2OH$; and a monomer represented by general formula (220):

$$cR^{221}R^{222}{=}cR^{223}{-}Z^{221}{-}CR^{224}{=}cR^{225}R^{226}$$

wherein $R^{221}$, $R^{222}$, $R^{223}$, $R^{224}$, $R^{225}$, and $R^{226}$ are the same or different, and are each a hydrogen atom or an alkyl group having 1 to 5 carbon atoms; 2221 is a linear or branched alkylene group having 1 to 18 carbon atoms and optionally having an oxygen atom, a cycloalkylene group having 3 to 18 carbon atoms, an at least partially fluorinated alkylene group or oxyalkylene group having 1 to 10 carbon atoms, or a (per)fluoropolyoxyalkylene group which is represented by:

$$-(Q)_p-CF_2O-(CF_2CF_2O)_m(CF_2O)_n-CF_2-(Q)_p-$$

(wherein Q is an alkylene group or an oxyalkylene group; p is 0 or 1; and m/n is 0.2 to 5) and has a molecular weight of 500 to 10,000.

Preferably $X^{183}$ and $X^{193}$ are each independently an iodine atom. Preferably $Rf^{181}$ and $Rf^{191}$ are each independently a perfluoroalkylene group having 1 to 5 carbon atoms. $R^{181}$ is preferably a hydrogen atom. $X^{201}$ is preferably a cyano group, an alkoxycarbonyl group, an iodine atom, a bromine atom, or $-CH_2I$. $X^{211}$ is preferably a cyano group, an alkoxycarbonyl group, an iodine atom, a bromine atom, or $-CH_2OH$.

The monomer that provides a crosslinking site is preferably at least one selected from the group consisting of $CF_2{=}CFOCF_2CF(CF_3)OCF_2CF_2CN$, $CF_2{=}CFOCF_2CF(CF_3)OCF_2CF_2COOH$, $CF_2{=}CFOCF_2CF(CF_3)OCF_2CF_2CH_2I$, $CF_2{=}CFOCF_2CF_2CH_2I$, $CH_2{=}CFCF_2OCF(CF_3)CF_2OCF(CF_3)CN$, $CH_2{=}CFCF_2OCF(CF_3)CF_2OCF(CF_3)COOH$, $CH_2{=}CFCF_2OCF(CF_3)CF_2OCF(CF_3)CH_2OH$, $CH_2{=}CHCF_2CF_2I$, $CH_2{=}CH(CF_2)_2CH{=}CH_2$, $CH_2{=}CH(CF_2)_6CH{=}CH_2$, and $CF_2{=}CFO(CF_2)_5CN$, and more preferably at least one selected from the group consisting of $CF_2{=}CFOCF_2CF(CF_3)0CF_2CF_2CN$ and $CF_2{=}CFOCF_2CF_2CH_2I$.

In the polymerization, the fluoromonomer may be polymerized with a fluorine-free monomer. An example of the fluorine-free monomer is a hydrocarbon monomer reactive with the fluoromonomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, monochlorovinyl acetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; alkyl allyl esters such as ethyl allyl ester, propyl allyl ester, butyl allyl ester, isobutyl allyl ester, and cyclohexyl allyl ester; and (meth)acrylic esters such as methyl acrylate, methyl methacrylate, ethyl acrylate, ethyl methacrylate, propyl acrylate, propyl methacrylate, butyl acrylate, butyl methacrylate, hexyl methacrylate, cyclohexyl methacrylate, and vinyl methacrylate.

The fluorine-free monomer may also be a functional group-containing hydrocarbon monomer (provided that a monomer that provides a crosslinking site is excluded). Examples of the functional group-containing hydrocarbon monomer include hydroxy alkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-free monomers having a carboxyl group, such as acrylic acid, methacrylic acid, itaconic acid, succinic acid, succinic anhydride, fumaric acid, fumaric anhydride, crotonic acid, maleic acid, maleic anhydride, and perfluorobutenoic acid; fluorine-free monomers having a sulfo group, such as vinylsulfonic acid; fluorine-free monomers having a glycidyl group, such as glycidyl vinyl ether and glycidyl allyl ether; fluorine-free monomers having an amino group such as aminoalkyl vinyl ether and aminoalkyl allyl ether; fluorine-free monomers having an amide group such as (meth)acrylamide and methylol acrylamide; and fluorine-free monomers having a nitrile group, such as acrylonitrile and methacrylonitrile.

In the polymerization, desired fluoropolymer particles can be obtained by polymerizing one or two or more of the above fluoromonomers.

Chain Transfer Agent

In the production method of the present disclosure, the fluoromonomer can be polymerized also in the presence of a chain transfer agent. The use of a chain transfer agent enables the polymerization rate and the molecular weight to be regulated. Examples of the chain transfer agent include esters such as dimethyl malonate, diethyl malonate, methyl acetate, ethyl acetate, butyl acetate, and dimethyl succinate, as well as isopentane, methane, ethane, propane, methanol, isopropanol, acetone, various mercaptans, various halogenated hydrocarbons such as carbon tetrachloride, and cyclohexane.

The chain transfer agent to be used may be a bromine compound or an iodine compound. An example of a polymerization method involving a bromine compound or an iodine compound is a method in which the fluoromonomer is polymerized in an aqueous medium substantially in the absence of oxygen and in the presence of a bromine compound or an iodine compound (iodine transfer polymerization). Representative examples of the bromine compound or the iodine compound to be used include compounds represented by the following general formula:

$$R^aI_xBr_y$$

wherein x and y are each an integer of 0 to 2 and satisfy $1 \le x+y \le 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or iodine compound include 1,3-diiodoperfluoropropane, 2-iodoperfluoropropane, 1,3-diiodo-2-chloroperfluoropropane, 1,4-diiodoperfluorobutane, 1,5-diiodo-2, 4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene, and one of these compounds may be used singly, or these compounds can also be mutually combined and used.

Among these, 1,4-diiodoperfluorobutane, 1,6-diiodoperfluorohexane, and 2-iodoperfluoropropane are preferably used from the viewpoint of polymerization reactivity, crosslinkability, availability, and the like.

The amount of the chain transfer agent used is usually 1 to 50,000 mass ppm, and preferably 1 to 20,000 mass ppm, based on the total amount of the fluoromonomer fed. The amount of the chain transfer agent used is preferably an amount such that the chain transfer agent is completely consumed during the polymerization of the fluoromonomer and does not remain in the aqueous dispersion containing the fluoropolymer so as not to deteriorate as much as possible the efficiency of removing the fluorine-containing surfactant and the fluorine-containing compound by heat treatment after preparing the aqueous dispersion. Accordingly, the amount of the chain transfer agent used is more preferably 10,000 mass ppm or less, more preferably 5,000 mass ppm or less, even more preferably 1,000 mass ppm or less, particularly preferably 500 mass ppm or less, and most preferably 200 mass ppm or less, based on the total amount of the fluoromonomer fed.

The chain transfer agent may be added to the reaction vessel at once before initiation of the polymerization, may be added at once after initiation of the polymerization, may be added in multiple portions during the polymerization, or may be added continuously during the polymerization.

Other Additives

Additives such as buffers, pH adjusters, stabilizing aids, and dispersion stabilizers can be used in the polymerization of the fluoromonomer. In the polymerization of the fluoromonomer, radical scavengers and decomposers may be added to regulate the polymerization rate and the molecular weight. Also, fluorine-free anionic surfactants, fluorine-free nonionic surfactants, fluorine-free cationic surfactants, and the like may be used in the polymerization of the fluoromonomer.

The stabilizing aid is preferably paraffin wax, fluorine-containing oil, a fluorine-containing solvent, silicone oil, or the like. One stabilizing aid may be used singly, or two or more may be used in combination. The stabilizing aid is more preferably paraffin wax. Paraffin wax may be in the form of a liquid, semi-solid, or solid at room temperature, and is preferably a saturated hydrocarbon having 12 or more carbon atoms. Usually, the melting point of paraffin wax is preferably 40 to 65 °C, and more preferably 50 to 65 °C The amount of the stabilizing aid used is preferably 0.1 to 12% by mass, and more preferably 0.1 to 8% by mass, based on the mass of the aqueous medium used. Desirably, the stabilizing aid is sufficiently hydrophobic so that the stabilizing aid is completely separated from the aqueous dispersion after polymerization, and does not serve as a contaminating component.

Polymerization Conditions

The fluoromonomer can be polymerized at normal pressure and temperature. Usually, a polymerization temperature is 5 to 120 °C and a polymerization pressure is 0.05 to 10 MPaG. The polymerization temperature and the polymerization pressure are suitably determined in accordance with, for example, the type of monomer, the molecular weight of the target fluoropolymer, and the reaction rate. The polymerization pressure is preferably higher than 0.05 MPa, more preferably higher than 0.10 MPaG, and even more preferably higher than 0.20 MPaG.

Aqueous Dispersion

Polymerization of the fluoromonomer yields an aqueous dispersion containing the fluoropolymer. The content of the fluoropolymer in the aqueous dispersion as polymerized is usually 8 to 50% by mass based on the aqueous dispersion.

The aqueous dispersion obtained by polymerizing the fluoromonomer usually contains, other than the fluoropolymer, a fluorine-containing surfactant used when polymerizing the fluoromonomer. Also, the aqueous dispersion obtained by polymerizing the fluoromonomer may contain, other than the fluoropolymer, a fluorine-containing compound produced by polymerizing the fluoromonomer. Herein, the fluorine-containing compound is a compound that is not added during polymerization of the fluoromonomer, such as a compound having a structure similar to that of the fluorine-containing surfactant but having a different number of carbon atoms.

A typical fluorine-containing compound in the aqueous dispersion is a water-soluble, fluorine-containing compound having a molecular weight of 1,000 g/mol or less. The production method of the present disclosure is capable of producing a fluoropolymer composition in which the content of the water-soluble, fluorine-containing compound having a molecular weight of 1,000 g/mol or less in the aqueous dispersion obtained by polymerizing the fluoromonomer is reduced. The molecular weight of the fluorine-containing compound may be, for example, 800 g/mol or less.

The aqueous dispersion in one embodiment contains a compound represented by the following general formula (1) as a water-soluble, fluorine-containing compound:

$$[X—Rf\text{-}A^-]_iM^{i+} \quad \text{General Formula (1)}$$

wherein X is H, Cl, Br, F, or I; Rf is a linear or branched, partially fluorinated or fully fluorinated aliphatic group, or a linear or branched, partially or fully fluorinated aliphatic group interrupted by at least one oxygen atom; $A^-$ is an acid group; $M^{i+}$ is a cation having a valence of i; and i represents an integer of 1 to 3.

The aqueous dispersion in one embodiment contains a compound represented by the following general formula (2) as a water-soluble, fluorine-containing compound:

$$[C_{n-1}F_{2n-1}COO^-]M^+ \quad \text{General formula (2)}$$

wherein n is an integer of 9 to 12, and $M^+$ represents a cation.

The compound represented by general formula (2) (perfluoroalkanoic acid) is known to be formed during polymerization when perfluoroalkyl vinyl ether or the like is used as a modifying monomer (see International Publication No. WO 2019/161153).

The aqueous dispersion in one embodiment contains a compound represented by the following general formula (3) as a water-soluble, fluorine-containing compound:

$$[R^1—O\text{-}L\text{-}CO_2^-]M^+ \quad \text{General formula (3)}$$

wherein $R^1$ is a linear or branched, partially fluorinated or fully fluorinated aliphatic group, or a linear or branched, partially fluorinated or fully fluorinated aliphatic group interrupted by at least one oxygen atom; L represents a linear or branched non-fluorinated, partially fluorinated, or fully fluorinated alkylene group; and $M^+$ represents a cation.

The aqueous dispersion in one embodiment contains a compound represented by general formula (4) as a water-soluble, fluorine-containing compound:

$$[H—(CF_2)_mCO_2^-]M^+ \quad \text{General formula (4)}$$

wherein m is an integer of 3 to 19, and $M^+$ represents a cation.

Fluoropolymer

A fluoropolymer such as fluororesin or fluoroelastomer is obtained by polymerizing the fluoromonomer.

Examples of fluororesin include a polytetrafluoroethylene (PTFE), a TFE/FAVE copolymer (PFA), a TFE/fluoroalkyl allyl ether copolymer, a TFE/HFP copolymer (FEP), an ethylene (Et)/TFE copolymer (ETFE), an Et/TFE/HFP copolymer, a polychlorotrifluoroethylene (PCTFE), a CTFE/TFE copolymer, an Et/CTFE copolymer, a polyvinyl fluoride (PVF), a polyvinylidene fluoride (PVdF), a VdF/TFE copolymer, a fluoromonomer/vinyl ester copolymer, and a polymer of a fluoromonomer represented by general formula (150).

In particular, the fluororesin is preferably at least one selected from the group consisting of PTFE, PFA, and FEP because the effects provided by the production method of the present disclosure are enhanced.

PTFE may be homo PTFE, or may be modified PTFE. Modified PTFE contains TFE unit and a modifying-monomer unit that is based on a modifying monomer copolymerizable with TFE. PTFE may be high molecular weight PTFE that is non melt-processible and is fibrillatable, or low molecular weight PTFE that is melt-processable and is not fibrillatable.

The modifying monomer is not limited as long as it can be copolymerized with TFE, and examples include perfluoroolefins such as hexafluoropropylene (HFP); chlorofluoroolefins such as CTFE; hydrogen-containing fluoroolefins such as trifluoroethylene and VdF; fluoroalkyl vinyl ether (FAVE); fluoroalkyl allyl ether; perfluoroalkylethylene; ethylene; and fluorine-containing vinyl ether having a nitrile group. One modifying monomer may be used singly, or multiple modified monomers may be used.

The fluoroelastomer may be a partially fluorinated elastomer or a perfluoroelastomer.

Examples of the partially fluorinated elastomer include a VdF-based fluoroelastomer, a TFE/propylene (Pr)-based fluoroelastomer, a TFE/propylene/VdF-based fluoroelastomer, an ethylene/HFP-based fluoroelastomer, an ethylene/HFP/VdF-based fluoroelastomer, an ethylene/HFP/TFE-based fluoroelastomer, and an ethylene/HFP/FAVE-based elastomer. In particular, at least one selected from the group consisting of a VdF-based fluoroelastomer and a TFE/propylene-based fluoroelastomer is preferable.

Specific examples of the VdF-based fluoroelastomer include a VdF/HFP-based elastomer, a VdF/HFP/TFE-based elastomer, a VdF/CTFE-based elastomer, a VdF/CTFE/TFE-based elastomer, an elastomer based on VdF and a fluoromonomer represented by general formula (100), an elastomer based on VdF/a fluoromonomer represented by general formula (100)/TFE, an elastomer based on VdF/perfluoro(methyl vinyl ether) (PMVE), a VdF/PMVE/TFE-based elastomer, and a VdF/PMVE/TFE/HFP-based elastomer. The elastomer based on VdF/a fluoromonomer represented by general formula (100) is preferably a VdF/$CH_2$═$CFCF_3$-based elastomer, and the elastomer based on VdF/a fluoromonomer represented by general formula (100)/TFE is preferably a VdF/TFE/$CH_2$═$CFCF_3$-based elastomer.

The perfluoroelastomer is preferably at least one selected from the group consisting of perfluoroelastomers containing TFE, such as a copolymer of TFE/a fluoromonomer represented by general formula (110), (130), or (140) and a copolymer of TFE/a fluoromonomer represented by general formula (110), (130), or (140)/a monomer that provides a crosslinking site.

The aqueous dispersion in one embodiment contains, as a fluoropolymer, a fluoropolymer having a fluoroalkyl vinyl ether unit.

The aqueous dispersion containing a fluoropolymer having a fluoroalkyl vinyl ether unit can be prepared by polymerizing fluoroalkyl vinyl ether as a fluoromonomer. When fluoroalkyl vinyl ether is used as a fluoromonomer, a compound represented by general formula (2) (perfluoroalkanoic acid) may be produced during the polymerization of the fluoromonomer. The aqueous dispersion containing a fluoropolymer having a fluoroalkyl vinyl ether unit may contain a compound represented by general formula (2) as a water-soluble, fluorine-containing compound.

The content of the fluoroalkyl vinyl ether unit in the fluoropolymer is preferably 0.0000001 to 30 mol %, more preferably 0.000001 mol % or more, and even more preferably 0.00001 mol % or more, and is preferably 25 mol % or less, more preferably 20 mol % or less, and particularly preferably 8 mol % or less, based on all polymerization units constituting the fluoropolymer.

Examples of fluoropolymers having such a polymerization unit include fluororesins such as PTFE modified with fluoroalkyl vinyl ether (PAVE) and a TFE/FAVE copolymer (PFA);

partially fluorinated elastomers such as an ethylene/HFP/FAVE-based elastomer, a VdF/PMVE-based elastomer, a VdF/PMVE/TFE-based elastomer, and a VdF/PMVE/TFE/HFP-based elastomer; and perfluoroelastomers.

The aqueous dispersion in one embodiment contains low molecular weight PTFE as a fluoropolymer.

Low molecular weight PTFE is generally produced by polymerization involving polymerization conditions for producing low molecular weight PTFE, or can be produced by reducing the molecular weight of high molecular weight PTFE obtained by polymerization by a known method (such as thermal decomposition or radiation decomposition). In the production method of the present disclosure, an aqueous dispersion containing low molecular weight PTFE can be prepared by polymerization involving polymerization conditions for producing low molecular weight PTFE.

Herein, high molecular weight PTFE means PTFE that is non melt-processible and is fibrillatable. On the other hand, low molecular weight PTFE means PTFE that is melt-processible and is not fibrillatable.

The term “non melt-processible” means a property that the melt flow rate cannot be measured at a temperature higher than the crystal melting point in accordance with ASTM D 1238 and D 2116.

The presence or absence of fibrillatability can be determined by “paste extrusion”, which is a representative method of forming a “high molecular weight PTFE powder”, which is a powder made of a TFE polymer. Usually, high molecular weight PTFE can be paste-extruded when it is fibrillatable. When a non-fired formed product obtained by paste extrusion shows substantially no strength or elongation, e.g., when it shows an elongation of 0% and is broken when stretched, it can be regarded as being not fibrillatable.

High molecular weight PTFE preferably has a standard specific gravity (SSG) of 2.130 to 2.280. The standard specific gravity is determined by the water replacement method in accordance with ASTM D 792 using a sample formed in accordance with ASTM D 4895 89. Herein, the “high molecular weight” means that the standard specific gravity is within the above range.

Low molecular weight PTFE has a melt viscosity of $1\times10^2$ to $7\times10^5$ Pa·s at 380 °C. Herein, the “low molecular weight” means that the melt viscosity is within the above range.

The aqueous dispersion prepared by polymerizing a fluoromonomer contains a fluorine-containing surfactant. The content of the fluorine-containing surfactant in the aqueous dispersion is preferably 500 mass ppm or more and more preferably 1,000 mass ppm or more, and is preferably 10% by mass or less, more preferably 5% by mass or less, and even more preferably 1% by mass or less, based on the mass of the fluoropolymer in the aqueous dispersion.

The aqueous dispersion prepared by polymerizing a fluoromonomer may contain a fluorine-containing compound. The content of the fluorine-containing compound in the aqueous dispersion is preferably 500 mass ppb or more and more preferably 1,000 mass ppb or more, and is preferably 1.0% by mass or less, more preferably 0.1% by mass or less, and even more preferably 0.01% by mass or less, based on the mass of the fluoropolymer in the aqueous dispersion.

The aqueous dispersion prepared by polymerizing a fluoromonomer may contain a fluorine-containing surfactant and a fluorine-containing compound. The total content of the fluorine-containing surfactant and the fluorine-containing compound in the aqueous dispersion is preferably 500 mass ppm or more and more preferably 1,000 mass ppm or more, and is preferably 10% by mass or less, more preferably 5% by mass or less, and even more preferably 1% by mass or less, based on the fluoropolymer in the aqueous dispersion.

Feeding of Inert Gas

After the aqueous dispersion is obtained, the feeding of the fluoromonomer is terminated, and an inert gas is fed to the reactor while the aqueous dispersion remains accommodated in the reactor. Accordingly, the fluoromonomer remaining in the reactor is replaced with the inert gas and, preferably, the polymerization of the fluoromonomer is terminated.

Feeding an inert gas to the reactor after preparing the aqueous dispersion and terminating the stirring of the contents of the reactor is preferable because the polymerization of the fluoromonomer can be more smoothly terminated.

Examples of the inert gas include, but are not limited to, nitrogen gas, argon gas, and helium gas.

The amount of the inert gas to be fed is not limited as long as it is sufficient to replace the residual fluoromonomer in the reactor with the inert gas. For example, the inert gas can be fed in an amount of 1 to 100 times the volume of the gaseous phase portion in the reactor. Also, the inert gas may be fed such that the reactor is slightly pressurized (exceeding 0.00 MPaG).

In the production method of the present disclosure, after the aqueous dispersion is prepared, the pressure in the reactor is preferably reduced to 0.20 MPaG or lower before feeding the inert gas. After the aqueous dispersion is obtained, the feeding of a fluoromonomer is terminated, the pressure in the reactor is reduced to 0.20 MPaG or less and then an inert gas is fed while the aqueous dispersion remains accommodated in the reactor, thereby the fluoromonomer remaining in the reactor is more reliably and more promptly replaced with an inert gas, and the efficiency of removing the fluorine-containing surfactant and the fluorine-containing compound is surprisingly improved. Moreover, the reduction of pressure in the reactor and the feeding of an inert gas may be repeated multiple times. The number of repetitions may be 2 or more and 3 or more, and may be 5 or less.

The upper limit of the pressure when reducing the pressure in the reactor is preferably 0.10 MPaG or less, more preferably 0.05 MPaG or less, even more preferably less than 0.00 MPaG, yet more preferably −0.0001 MPaG or less, particularly preferably −0.001 MPaG or less, and most preferably −0.01 MPaG or less because the efficiency of removing the fluorine-containing surfactant and the fluorine-containing compound is more improved. The lower the lower limit of the pressure when reducing the pressure in the reactor, the more preferable, and the lower limit is preferably −0.8 MPaG or more in consideration of the balance between the obtained effect and the cost.

The time for which the reactor is retained under a desired pressure or less is not limited, and is a time that enables the fluoromonomer remaining in the reactor to be sufficiently removed, which is usually 0.1 to 30 minutes.

The pressure in the reactor can be reduced by a known means, such as a compressor. The fluoromonomer removed from the reactor can be recovered by a known method. The recovered fluoromonomer may be reused to produce the fluoropolymer.

After the pressure in the reactor is reduced, an inert gas is preferably fed such that the pressure in the reactor is increased to 0.00 MPaG or higher because the efficiency of removing the fluorine-containing surfactant and the fluorine-containing compound is more improved.

By feeding an inert gas to the reactor and optionally reducing the pressure in the reactor, the concentration of the fluoromonomer constituting the gas that fills the reactor is sufficiently reduced, and thereby the efficiency of removing the fluorine-containing surfactant and the fluorine-containing compound by the subsequent heat treatment is more improved. The concentration of the fluoromonomer constituting the gas that fills the reactor is preferably 10,000 mass ppm or less, and more preferably 1,000 mass ppm or less. The lower the lower limit of the concentration the fluoromonomer, the more preferable, and the lower limit is preferably 1 mass ppm or more in consideration of the balance between the obtained effect and the cost.

To terminate the polymerization reaction of the fluoromonomer, a polymerization terminator (a radical scavenger) may be added.

The polymerization terminator may be a compound having no reinitiation ability after addition or chain transfer to a free radical in the polymerization system. Specifically, used is a compound that readily undergoes a chain transfer reaction with a primary radical or a propagating radical and then generates a stable radical that does not react with a monomer or a compound that readily undergoes an addition reaction with a primary radical or a propagating radical to generate a stable radical. The activity of what is commonly referred to as a chain transfer agent is characterized by the chain transfer constant and the reinitiation efficiency, and, among the chain transfer agents, those having almost 0% reinitiation efficiency are called polymerization terminators. The polymerization terminator is preferably at least one selected from the group consisting of aromatic hydroxy compounds, aromatic amines, N,N-diethylhydroxylamine, quinone compounds, terpenes, thiocyanates, and cupric chloride ($CuCl_2$). Examples of the aromatic hydroxy compound include unsubstituted phenols, polyhydric phenols, salicylic acid, m- or p-salicylic acid, gallic acid, and naphthol. Examples of unsubstituted phenols include o-, m-, or p-nitrophenol, o-, m-, or p-aminophenol, and p-nitrosophenol. Examples of polyhydric phenols include catechol, resorcin, hydroquinone, pyrogallol, phloroglucin, and naphthresorcinol. Examples of aromatic amines include o-, m-, or p-phenylenediamine and benzidine. Examples of quinone compounds include hydroquinone, o-, m- or p-benzoquinone, 1,4-naphthoquinone, and alizarin. Examples of thiocyanates include ammonium thiocyanate ($NH_4SCN$), potassium thiocyanate (KSCN), and sodium thiocyanate (NaSCN). In particular, the polymerization terminator is preferably a quinone compound, and more preferably hydroquinone.

Heat Treatment

After an inert gas is fed to the reactor, heat treatment is performed on the aqueous dispersion accommodated in the same reactor.

The temperature of the heat treatment is preferably 35 °C or higher, more preferably 40 °C or higher, even more preferably 45 °C or higher, and particularly preferably 50 °C or higher, and is preferably 120 °C or lower, more preferably 110 °C or lower, even more preferably 100 °C or lower, and particularly preferably 90 °C or lower, because the efficiency of removing the fluorine-containing surfactant and the fluorine-containing compound is more improved.

When the heat treatment temperature is relatively high, the fluoropolymer in the aqueous dispersion may partially or entirely precipitate due to heat treatment. Accordingly, when obtaining the aqueous dispersion in which the fluoropolymer is dispersed in an aqueous medium as a fluoropolymer composition obtained by heat treatment, the upper limit of the heat treatment temperature needs to be selected. When obtaining the aqueous dispersion as a fluoropolymer composition obtained by heat treatment, the heat treatment temperature is preferably 95 °C or lower, more preferably 90 °C or lower, and even more preferably 85 °C or lower because precipitation of the fluoropolymer can be suppressed without impairing the efficiency of removing the fluorine-containing surfactant and the fluorine-containing compound.

In the heat treatment of the aqueous dispersion, it is not always necessary to heat the aqueous dispersion as long as the aqueous dispersion can be maintained at a desired temperature or higher. For example, when the temperature at which the fluoromonomer is polymerized is sufficiently high and the temperature of the resulting aqueous dispersion is also sufficiently high, an inert gas can be fed to the reactor before the resulting aqueous dispersion is cooled, and then the heat treatment can be initiated. However, from the viewpoint of strictly controlling the temperature and time of the heat treatment, the aqueous dispersion is preferably heated in the heat treatment. For example, if the temperature when the fluoromonomer is polymerized is sufficiently high, the aqueous dispersion can be heated such that this polymerization temperature is maintained as-is. While the aqueous dispersion may be cooled before the heat treatment, it is preferable from the viewpoint of productivity to polymerize the fluoromonomer, then an inert gas is fed without cooling, and initiate the heat treatment.

The means of heating when performing the heat treatment while heating the aqueous dispersion is not limited. Since the reactor used in polymerization is usually provided with a means of heating such as a heater, such a means of heating is used.

The pressure during heat treatment is not limited, and may be atmospheric pressure. For example, when the temperature during heat treatment is relatively high, and boiling of the aqueous dispersion needs to be suppressed, the pressure during heat treatment may exceed atmospheric pressure.

The heat treatment time is not limited, and is preferably 15 minutes or more, more preferably 30 minutes or more, and even more preferably 60 minutes or more, and is preferably 1,200 minutes or less, more preferably 900 minutes or less, and even more preferably 600 minutes or less, because the efficiency of removing the fluorine-containing surfactant and the fluorine-containing compound is more improved.

Heat treatment may be performed while stirring the aqueous dispersion. When stirring is stopped before the inert gas is fed, stirring is preferably resumed after feeding the inert gas to the reactor.

The content of the fluoropolymer in the aqueous dispersion to be heat-treated can be regulated by dilution or concentration. The content of the fluoropolymer in the aqueous dispersion to be heat-treated is preferably 1% by mass or more based on the mass of the aqueous dispersion because a fluoropolymer composition can be produced at high productivity without impairing the efficiency of removing the fluorine-containing surfactant and the fluorine-containing compound. The lower limit of the content of the fluoropolymer, in order of preference, is 10% by mass or more, 15% by mass or more, 20% by mass or more, 25% by mass or more, and 30% by mass or more. The upper limit of the content of the fluoropolymer is preferably 60% by mass or less, more preferably 55% by mass or less, and even more preferably 50% by mass or less.

Radical Generator

The aqueous dispersion may be heat treated in the presence of a radical generator. By using a radical generator, the efficiency of removing the fluorine-containing surfactant and the fluorine-containing compound by heat treatment can be more improved. The radical generator can be added to the aqueous dispersion, for example, after feeding the inert gas to the reactor.

The radical generator is not limited as long as it is a compound that can generate radicals by being decomposed at a heat treatment temperature. The radical generator is a water-soluble radical generator because radicals can be easily diffused in the aqueous dispersion.

Examples of the radical generator include organic peroxides, inorganic peroxides, organic azo compounds, and combinations of oxidizing agents and reducing agents, and the preferable is at least one selected from the group consisting of inorganic peroxides, organic peroxides, and combinations of oxidizing agents and reducing agents.

The inorganic peroxide is preferably a water-soluble inorganic peroxide. Examples of the inorganic peroxide include hydrogen peroxide, perchlorates, perborates, perphosphates, percarbonates, and persulfates, and a persulfate is preferable. The persulfate is preferably at least one selected from the group consisting of ammonium persulfate, sodium persulfate, and potassium persulfate, and more preferably ammonium persulfate.

The organic peroxide is preferably a water-soluble organic peroxide. Examples of the organic peroxide include peroxydicarbonates such as disuccinic acid peroxide and diglutaric acid peroxide.

The radical generator may be a combination of an oxidizing agent and a reducing agent. The use of a combination of an oxidizing agent and a reducing agent enables radicals to be generated from the radical generator through a redox reaction between the oxidizing agent and the reducing agent, and thus the temperature during heat treatment can be lowered.

Examples of the oxidizing agent include persulfates, organic peroxides, potassium permanganate, manganese triacetate, and ammonium cerium nitrate. Examples of the reducing agent include sulfite, bisulfite, bromate, diimine, and oxalic acid. Examples of persulfates include ammonium persulfate and potassium persulfate. Examples of sulfites include sodium sulfite and ammonium sulfite. In order to increase the decomposition rate of the oxidizing agent, a copper salt or an iron salt is also preferably added. The copper salt may be copper(II) sulfate, and the iron salt may be iron(II) sulfate.

Examples of the combination of an oxidizing agent and a reducing agent include potassium permanganate/oxalic acid, ammonium persulfate/bisulfite/iron sulfate, manganese triacetate/oxalic acid, cerium ammonium nitrate/oxalic acid, and bromate/bisulfite, and potassium permanganate/oxalic acid is preferable. When using a combination of an oxidizing agent and a reducing agent, one of an oxidizing agent and a reducing agent may be added to the aqueous dispersion in advance, and then the other may be added continuously or intermittently.

From the viewpoint of increasing the efficiency of removing the fluorine-containing surfactant and the fluorine-containing compound, the amount of the radical generator added is preferably 0.0001 mol times or more, more preferably 0.001 mol times or more, and even more preferably 0.01 mol times or more, and is preferably 1,000 mol times or less, more preferably 500 mol times or less, and even more preferably 100 mol times or less, per mole number of the fluorine-containing surfactant in the aqueous dispersion.

When the amount of the radical generator added is relatively large, the fluoropolymer in the aqueous dispersion may partially or entirely precipitate due to heat treatment. Accordingly, when obtaining the aqueous dispersion in which the fluoropolymer is dispersed in an aqueous medium as a fluoropolymer composition obtained by heat treatment, the upper limit of the amount of the radical generator added needs to be selected. When obtaining the aqueous dispersion as a fluoropolymer composition obtained by heat treatment, the amount of the radical generator added is preferably 50 mol times or less, more preferably 25 mol times or less, and even more preferably 10 mol times or less per mole number of the fluorine-containing surfactant in the aqueous dispersion because precipitation of the fluoropolymer can be suppressed without impairing the efficiency of removing the fluorine-containing surfactant and the fluorine-containing compound.

The method for adding the radical generator is not limited. The radical generator may be added as-is to the aqueous dispersion, or a solution containing the radical generator may be prepared and added to the aqueous dispersion. The radical generator may be added while stirring the aqueous dispersion, or the aqueous dispersion may be stirred after adding the radical generator.

Fluoropolymer Composition

After the aqueous dispersion is subjected to the heat-treated, a fluoropolymer composition is obtained. The fluoropolymer composition after heat treatment may be cooled.

The form of the fluoropolymer composition is not limited, and may be an aqueous dispersion (a heat-treated aqueous dispersion), powder, slurry, gel, or the like. An aqueous dispersion is preferable from the viewpoint of excellent handleability. In the aqueous dispersion, fluoropolymer particles are preferably dispersed in an aqueous medium. Irrespective of the form of the fluoropolymer composition, the content of the fluorine-containing surfactant used when polymerizing the fluoromonomer and the content of the fluorine-containing compound produced by polymerizing the fluoromonomer are reduced in the fluoropolymer composition obtained by the production method of the present disclosure, and the purity of the fluoropolymer is extremely high.

The content of the fluorine-containing surfactant in the fluoropolymer composition is preferably less than 500 mass ppm and more preferably 300 mass ppm or less based on the mass of the fluoropolymer.

The content of the fluorine-containing compound in the fluoropolymer composition is preferably less than 500 ppm by mass based on the mass of the fluoropolymer.

The total content of the fluorine-containing surfactant and the fluorine-containing compound in the fluoropolymer composition is preferably less than 500 mass ppm and more preferably 300 mass ppm or less based on the mass of the fluoropolymer.

The content of the fluorine-containing surfactant and the content of the fluorine-containing compound produced by polymerizing the fluoromonomer in the aqueous dispersion or in the fluoropolymer composition can be measured by liquid chromatography-mass spectrometry (LC/MS/MS).

First, methanol is added to the composition to perform extraction, and the resulting extract is subjected to LC/MS/MS analysis. In order to further improve the extraction efficiency, treatment by Soxhlet extraction, ultrasonic treatment or the like may be performed.

Molecular weight information is extracted from the resulting LC/MS/MS spectrum to confirm agreement with the structural formulae of the candidate fluorine-containing surfactant and fluorine-containing compound.

Thereafter, aqueous solutions having five or more different content levels of the confirmed fluorine-containing surfactant and fluorine-containing compound are prepared, and the LC/MS/MS analysis is carried out on the aqueous solutions with the respective content levels, and the relationship between the content level and the area corresponding to that content level is plotted to draw a calibration curve.

Then, using the calibration curve, the area of the LC/MS/MS chromatogram of the fluorine-containing surfactant and the fluorine-containing compound in the extract can be converted to the content of the fluorine-containing surfactant and the fluorine-containing compound.

After-Treatment

The fluoropolymer composition obtained by subjecting to the heat treatment may be brought into contact with an adsorbent. The form of the fluoropolymer composition in this case is preferably an aqueous dispersion.

When the fluoropolymer composition obtained by subjecting to the heat treatment is an aqueous dispersion, the fluoropolymer composition may be diluted or concentrated by a known means.

Examples of the concentration method include a phase separation concentration method, an electroconcentration method, an electrophoresis method, an ion exchanger method, and a membrane concentration method. The phase separation and concentration method, ion exchanger method, and membrane concentration method can be carried out under conventionally known treatment conditions, and can be carried out by, but are not limited to, the methods disclosed in International Publication No. WO 2004/050719, National Publication of International Patent Application No. 2002-532583, and Japanese Patent Laid-Open No. 55-120630.

When the fluoropolymer composition is recovered as a slurry or a wet polymer after heat treatment, powder, gum, crumb, or the like of the fluoropolymer can be obtained by drying the slurry or the wet polymer. When the fluoropolymer composition obtained by subjecting to the heat treatment is an aqueous dispersion, powder or the like can be obtained by agglomerating the fluoropolymer and optionally drying the agglomerate.

The method for agglomerating the fluoropolymer is not limited. For example, the aqueous dispersion is diluted with water to a polymer concentration of 5 to 20% by mass, optionally the pH is regulated to neutral or alkaline, and then the aqueous dispersion is stirred more vigorously than during polymerization of the fluoromonomer in a container equipped with a stirrer. The fluoropolymer may be agglomerated by adding a water-soluble organic compound such as methanol or acetone, an inorganic salt such as potassium nitrate or ammonium carbonate, or an inorganic acid such as hydrochloric acid, sulfuric acid, or nitric acid as a coagulating agent to the aqueous dispersion, and stirring the mixture. After the fluoropolymer is agglomerated, the agglomerated fluoropolymer can be recovered as a wet polymer.

The slurry or wet polymer may be dried.

When the fluoropolymer is a melt-processible fluoropolymer, a powder of the fluoropolymer composition obtained by drying may be formed into pellets by melt extrusion forming.

The fluoropolymer composition as obtained above can be used in various applications.

The fluoropolymer composition (powder) containing PTFE as a fluoropolymer is preferable for forming, and suitable applications include tubes and the like for hydraulic systems and fuel systems of aircrafts and automobiles, flexible hoses for chemical liquid, steam, and the like, and electric wire coating applications.

The fluoropolymer composition (an aqueous dispersion) containing PTFE as a fluoropolymer is preferably mixed with a nonionic surfactant to stabilize and further concentrate the aqueous dispersion, and then further mixed with, depending on its purpose, an organic or inorganic filler to form a composition and used in a variety of applications. The composition, when applied to a metal or ceramic substrate, can provide a coating surface having non-stickiness, a low coefficient of friction, and excellent gloss, smoothness, abrasion resistance, weather resistance, and heat resistance, which is suitable for coating of rolls, cooking utensils, and the like, and impregnation processing of glass cloth, and the like.

An organosol can also be prepared from the fluoropolymer composition (an aqueous dispersion) containing PTFE as a fluoropolymer. The organosol may contain PTFE and an organic solvent, examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents, and N-methyl-2-pyrrolidone and dimethylacetamide are suitably used. The organosol may be prepared by the method described in, for example, International Publication No. WO 2012/002038.

The fluoropolymer composition containing PTFE as a fluoropolymer is also preferably used as a processing aid. When used as a processing aid, the aqueous dispersion or the fine powder is mixed with a host polymer or the like to improve the melt strength of the host polymer in melt processing and to improve the mechanical strength, electric properties, incombustibility, anti-drop performance during combustion, and slidability of the resulting polymer.

The fluoropolymer composition containing PTFE as a fluoropolymer is also preferably used as a binder for batteries or in dustproof applications.

The fluoropolymer composition containing PTFE as a fluoropolymer is also preferably combined with a resin other than PTFE and used as a processing aid. The fluoropolymer composition is suitable as a raw material of PTFE disclosed in, for example, Japanese Patent Laid-Open No. 11-49912, U.S. Pat. No. 5,804,654, Japanese Patent Laid-Open No. 11-29679, and Japanese Patent Laid-Open No. 2003-2980. The processing aid containing the fluoropolymer composition is not inferior in any way to the processing aids disclosed in the publications.

The fluoropolymer composition (an aqueous dispersion) containing PTFE as a fluoropolymer is also preferably mixed with an aqueous dispersion of a melt-processible fluororesin so that the components coagulate to form co-coagulated powder. The co-coagulated powder is suitable as a processing aid.

Examples of the melt-processible fluororesin include FEP, PFA, TFE/fluoroalkyl allyl ether copolymers, ETFE, and ethylene/TFE/HFP copolymers (EFEP), and, in particular, PFA, TFE/fluoroalkyl allyl ether copolymers, and FEP are preferable.

The aqueous dispersion also preferably contains a melt-processible fluororesin. Examples of the melt-processible fluororesin include FEP, PFA, TFE/fluoroalkyl allyl ether copolymers, ETFE, and EFEP. The aqueous dispersion containing the melt-processible fluororesin may be used as a coating material. The melt-processible fluororesin enables sufficient fusion of PTFE particles, thus improving the film-formability and providing the resulting film with gloss.

The fluorine-free resin to which the co-coagulated powder is added may be in the form of powder, pellets, or an emulsion. The addition is preferably performed while applying a shear force by a known method such as extrusion kneading or roll kneading from the viewpoint of sufficiently mixing each resin.

The fluoropolymer composition containing PTFE as a fluoropolymer is also preferably used as a dust suppression treatment agent. The dust suppression treatment agent can be used in a method for suppressing dust of a dust-generating substance by fibrillating PTFE by mixing with a dust-generating substance and applying a compression-shearing action to the mixture at a temperature of 20 to 200 °C, such as a method disclosed in Japanese Patent No. 2827152 or Japanese Patent No. 2538783. The fluoropolymer composition can be suitably used for, for example, the dust suppression treatment agent composition described in International Publication No. WO 2007/004250, and can be suitably used in the dust control treatment method described in International Publication No. WO 2007/000812 as well.

The dust control treatment agent is suitably used in dust suppression treatment in the fields of building-products, soil stabilizers, solidifying materials, fertilizers, landfill of incineration ash and harmful substance, and explosion proof equipment, cosmetics, and sands for pet excretion represented by cat sand.

The fluoropolymer composition (an aqueous dispersion) containing PTFE as a fluoropolymer is also preferably used as a material for producing PTFE fibers by a dispersion spinning method. The dispersion spinning method is a method in which the aqueous dispersion of PTFE and an aqueous dispersion of a matrix polymer are mixed and the mixture is extruded to form an intermediate fiber structure, and then the intermediate fiber structure is fired to decompose the matrix polymer and sinter PTFE particles, thereby providing PTFE fibers.

The fluoropolymer composition (powder) containing PTFE as a fluoropolymer has stretchability and non melt-processability, and is also useful as a raw material for a stretched body (porous body). When the stretched body of the present disclosure is a film (PTFE stretched film or PTFE porous film), the stretched body can be formed by stretching by a known PTFE stretching method. Stretching allows easy formation of fibrils of high-molecular-weight PTFE, resulting in a PTFE porous body (film) including nodes and fibers. Preferably, roll-stretching a sheet-shaped or rod-shaped paste extrudate in an extruding direction can provide a uniaxially stretched film. Further stretching in a transverse direction using a tenter, for example, can provide a biaxially stretched film. Prebaking treatment is also preferably performed before stretching.

This PTFE stretched body is a porous body having a high porosity, and can suitably be used as a filter material for a variety of microfiltration filters such as air filters and chemical filters and a support member for polymer electrolyte films. The stretched body is also useful as a material of products used in the fields of textiles, of medical treatment, of electrochemistry, of sealants, of air filters, of ventilation/internal pressure adjustment, of liquid filters, and of consumer goods. The following provides examples of specific applications.

Electrochemical Field

Examples of applications in this field include prepregs for dielectric materials, EMI-shielding materials, and heat conductive materials. More specifically, examples include printed circuit boards, electromagnetic interference shielding materials, insulating heat conductive materials, and insulating materials.

Sealant Field

Examples of applications in this field include gaskets, packings, pump diaphragms, pump tubes, and sealants for aircraft.

Air Filter Field

Examples of applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of applications in this field include liquid filters for semiconductors (for production of semiconductors), hydrophilic PTFE filters (for production of semiconductors), filters for chemicals (for chemical liquid treatment), filters for pure water production lines (for production of pure water), and back-washing liquid filters (for treatment of industrial discharge water).

Consumer Goods Field

Examples of applications in this field include clothes, cable guides (movable wires for motorcycles), clothes for motor cyclists, cast liners (medical supporters), filters for cleaners, bagpipes (musical instruments), cables (such as signal cables for guitars), and strings (for string instrument).

Textile Field

Examples of applications in this field include PTFE fibers (fiber materials), machine threads (textiles), weaving yarns (textiles), and ropes.

Medical Treatment Field

Examples of applications in this field include implants (stretched articles), artificial blood vessels, catheters, general surgical operations (tissue reinforcing materials), products for head and neck (dura mater alternatives), oral health (tissue regenerative medicine), and orthopedics (bandages).

The fluoropolymer composition containing low molecular weight PTFE as a fluoropolymer is suitably used as an additive for improving the lubricity and the texture of the coating surface in the production of plastics, inks, cosmetics, coating materials, greases, parts of office automation equipment, and toners (e.g., see Japanese Patent Laid-Open No. 10-147617).

Thus, the fluoropolymer composition containing FEP as a fluoropolymer may be used in the production of a variety of formed articles such as covering materials for electric wires, foamed electric wires, cables, and wires, tubes, films, sheets, and filaments.

The fluoropolymer composition containing a TFE/FAVE copolymer (PFA) or a TFE/fluoroalkyl allyl ether copolymer as a fluoropolymer can be suitably used in sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires. Preferable among these are tubes, pipes, tanks, connectors, and the like to be used in a variety of chemical reaction devices, semiconductor manufacturing devices, and acidic or alkaline chemical feeding devices each requiring chemical impermeability.

The fluoropolymer composition (an aqueous dispersion) containing a TFE/FAVE copolymer (PFA) or a TFE/fluoroalkyl allyl ether copolymer as a fluoropolymer may also be suitably mixed with a nonionic surfactant, and optionally polyethersulfone, polyamide-imide, and/or polyimide, and metal powder are dissolved or dispersed in an organic solvent, and thereby a primer composition can be obtained. This primer composition may be used in a method of applying a fluororesin to a metal surface. The method includes applying the primer composition to a metal surface, applying the fluoropolymer composition to the resulting primer layer, and firing the fluoropolymer composition layer together with the primer layer.

The form of the fluoropolymer composition containing fluoroelastomer as a fluoropolymer is preferably gum or crumb. The fluoropolymer composition in the form of gum, crumb, or the like may be mixed with an additive such as a curing agent and a filler to be processed into a fluoroelastomer composition.

Examples of the curing agent include polyols, polyamines, organic peroxides, organotins, bis(aminophenol)tetraamine, and bis(thioaminophenol).

The fluoroelastomer composition may be formed and crosslinked to form a fluoroelastomer formed article. The fluoroelastomer formed article is suitable for seals, gaskets, electric wire coatings, hoses, tubes, laminated products, and accessories, particularly parts for semiconductor manufacturing devices and automobile parts.

While embodiments have been described above, it will be understood that various changes in form and details can be made without departing from the gist and scope of the claims.

The present disclosure provides a fluoropolymer composition production method for producing a fluoropolymer composition comprising a fluoropolymer, the method comprising polymerizing a fluoromonomer in a reactor in the presence of a fluorine-containing surfactant, a polymerization initiator, and an aqueous medium to prepare an aqueous dispersion comprising a fluoropolymer; feeding an inert gas to the reactor; and subjecting to a heat treatment the aqueous dispersion in the reactor to give a fluoropolymer composition.

In the production method of the present disclosure, it is preferred that after the aqueous dispersion is prepared, and the pressure in the reactor is reduced to 0.20 MPaG or lower, the inert gas is fed to the reactor.

In the production method of the present disclosure, it is preferred that after the aqueous dispersion is prepared, and the pressure in the reactor is reduced to lower than 0.00 MPaG, the inert gas is fed to the reactor.

In the production method of the present disclosure, the pressure in the reactor is preferably increased to 0.00 MPaG or higher by feeding the inert gas to the reactor.

In the production method of the present disclosure, the temperature of the heat treatment is preferably 35 °C or higher.

In the production method of the present disclosure, the content of the fluoropolymer in the aqueous dispersion to be subjected to the heat treatment is preferably 1% by mass or more.

In the production method of the present disclosure, the fluoropolymer composition is preferably an aqueous dispersion or a powder.

In the production method of the present disclosure, it is preferred that after the aqueous dispersion is obtained as the fluoropolymer composition by the heat treatment, the aqueous dispersion is cooled.

In the production method of the present disclosure, it is preferred that a radical generator is added to the aqueous dispersion, and the aqueous dispersion is subjected to the heat treatment in the presence of the radical generator.

In the production method of the present disclosure, it is preferred that after the aqueous dispersion is obtained as the fluoropolymer composition by subjecting to the heat treatment, the aqueous dispersion is concentrated.

In the production method of the present disclosure, it is preferred that after the aqueous dispersion is obtained as the fluoropolymer composition by subjecting to the heat treatment, the fluoropolymer in the aqueous dispersion is agglomerated, and optionally the agglomerate is dried.

In the production method of the present disclosure, the fluorine-containing surfactant is preferably an anionic fluorine-containing surfactant represented by the following general formula)($N^0$):

$$X^{n0}-Rf^{n0}-Y^0 \qquad (N^0)$$

wherein $X^{n0}$ is H, Cl, or F; $Rf^{n0}$ is a linear, branched, or cyclic alkylene group having 3 to 20 carbon atoms in which some or all of H are replaced by F, the alkylene group optionally containing one or more ether bonds in which some of H are optionally replaced by Cl; and $Y^0$ is an anionic group.

In the production method of the present disclosure, preferably the aqueous dispersion obtained by polymerizing the fluoromonomer comprises a water-soluble, fluorine-containing compound having a molecular weight of 1,000 g/mol or less, and the fluoropolymer composition having a reduced content of the water-soluble, fluorine-containing compound is obtained by subjecting to the heat treatment.

In the production method of the present disclosure, the water-soluble, fluorine-containing compound is preferably a compound represented by general formula (1):

$$[X—Rf\text{-}A^-]_iM^{i+} \qquad \text{General Formula (1)}$$

wherein X is H, Cl, Br, F, or I; Rf is a linear or branched, partially fluorinated or fully fluorinated aliphatic group, or a linear or branched, partially or fully fluorinated aliphatic group interrupted by at least one oxygen atom; $A^-$ is an acid group; $M^{i+}$ is a cation having a valence of i; and i represents an integer of 1 to 3.

In the production method of the present disclosure, the water-soluble, fluorine-containing compound is preferably a compound represented by general formula (2):

$$[C_{n-1}F_{2n-1}COO^-]M^+ \qquad \text{General formula (2)}$$

wherein n is an integer of 9 to 12, and $M^+$ represents a cation.

In the production method of the present disclosure, the water-soluble, fluorine-containing compound is preferably a compound represented by general formula (3):

$$[R^1—O\text{-}L\text{-}CO_2^-]M^+ \qquad \text{General formula (3)}$$

wherein $R^1$ is a linear or branched, partially fluorinated or fully fluorinated aliphatic group, or a linear or branched, partially fluorinated or fully fluorinated aliphatic group interrupted by at least one oxygen atom; L represents a linear or branched non-fluorinated, partially fluorinated, or fully fluorinated alkylene group; and $M^+$ represents a cation.

In the production method of the present disclosure, the fluoropolymer is preferably at least one selected from the group consisting of a polytetrafluoroethylene, a tetrafluoroethylene/fluoroalkyl vinyl ether copolymer, a tetrafluoroethylene/fluoroalkyl allyl ether copolymer, a tetrafluoroethylene/hexafluoropropylene copolymer, an ethylene/tetrafluoroethylene copolymer, an ethylene/tetrafluoroethylene/hexafluoropropylene copolymer, a polychlorotrifluoroethylene, a chlorotrifluoroethylene/tetrafluoroethylene copolymer, an ethylene/chlorotrifluoroethylene copolymer, a polyvinyl fluoride, a polyvinylidene fluoride, a vinylidene fluoride/tetrafluoroethylene copolymer, a fluoromonomer/vinyl ester copolymer, a polymer of a fluoromonomer represented by general formula (150): $CF_2═CF—O—(CF_2CFY^{151}—O)_n—(CFY^{152})_m\text{-}A^{151}$, wherein $Y^{151}$ represents fluorine atom, chlorine atom, $—SO_2F$ group, or a perfluoroalkyl group; the perfluoroalkyl group optionally contains ether oxygen or $—SO_2F$ group; n represents an integer of 0 to 3; n $Y^{151}$ groups are the same or different; $Y^{152}$ represents fluorine atom, chlorine atom, or $—SO_2F$ group; m represents an integer of 1 to 5; m $Y^{152}$ groups are the same or different; $A^{151}$ represents $—SO_2X^{151}$, $—COZ^{151}$, or $—POZ^{152}Z^{153}$; $X^{151}$ represents F, Cl, Br, I, $—OR^{151}$, or $—NR^{152}R^{153}$; $Z^{151}$, $Z^{152}$, and $Z^{153}$ are the same or different, and each independently represent $—NR^{154}R^{155}$ or $—OR^{156}$; and $R^{151}$, $R^{152}$, $R^{153}$, $R^{154}$, $R^{155}$ and $R^{156}$ are the same or different, and each independently represent H, ammonium, an alkali metal, or an alkyl group, an aryl group, or a sulfonyl-containing group optionally containing fluorine atom; and a fluoroelastomer.

EXAMPLES

Next, embodiments of the present disclosure will now be described with reference to Examples, but the present disclosure is not limited only to these Examples.

Various numerical values in the Examples were measured by the following methods.

Solid Concentration of Aqueous Dispersion

One gram of an aqueous dispersion was dried in an air dryer under at 150 °C for 60 minutes, and a value expressed in percentage that is the proportion of the mass of the heating residue to the mass (1 g) of the aqueous dispersion was used as a solid concentration.

Melt Viscosity

The melt viscosity was measured while maintaining 2 g of a sample, which was heated at 380 °C for 5 minutes in advance, at that temperature under a load of 0.7 MPa in accordance with ASTM D 1238 using a flow tester (manufactured by Shimadzu Corporation) and a 2ϕ-8L die.

Standard Specific Gravity (SSG)

Using a sample formed in accordance with ASTM D 4895-89, the SSG was determined by the water replacement method in accordance with ASTM D-792.

Content of Modifying Monomer Unit (PTFE)

The content of PPVE unit in PTFE was determined from the infrared absorbance obtained by producing a thin film disk by press-forming a PTFE powder and carrying out FT-IR measurement, in which the ratio of absorbance at 995 $cm^{-1}$/absorbance at 935 $cm^{-1}$ was multiplied by 0.14.

Content of PPVE Unit (PFA)

The content of PPVE unit in PFA was determined by 19F-NMR analysis.

Peak Temperature

The peak temperature was measured using TG/DTA (thermogravimetric-differential thermal analyzer) by precisely weighing about 10 mg of a PTFE powder, which had no history of being heated to a temperature of 300 °C or higher, and storing it in a dedicated aluminum pan. A differential thermal (DTA) curve by heating the aluminum pan under the condition of 10 °C/min in a temperature range from 25 °C to 600 °C in air was obtained, and the temperature corresponding to the maximum value of the resulting differential thermal (DTA) curve was regarded as the peak temperature.

Melting Point

The melting point was measured using a differential scanning calorimeter (DSC). A 10 mg sample was weighed, heated from 140 °C to 360 °C at 10 °C/min, retained at 360 °C for 1 minute, then cooled to 140 °C at 10 °C/min, retained at 140 °C for 1 minute, and again heated to 380 °C at 10 °C/min. The melting peak temperature (Tm) from the melting curve obtained during the second heating was regarded as a melting point.

Melt Flow Rate (MFR)

Using a melt indexer equipped with a corrosion-resistant cylinder, die, and piston (manufactured by Toyo Seiki Seisaku-sho, Ltd.) compliant with ASTM D 1238-95, 5 g of a sample was placed and retained for 5 minutes in the cylinder retained at 372±1 °C, then extruded through a die orifice under a load (the piston and a weight) of 5 kg, and the extrusion rate (g/10 min) of the melt at this time was determined as MFR.

Measurement of Contents of Perfluorohexanoic Acid, Perfluoroundecanoic Acid, and Perfluoroethercarboxylic Acid a Contained in Extract 1. Calibration curves of perfluorohexanoic acid, perfluoroundecanoic acid, and perfluoroethercarboxylic acid A
 Five concentration levels of methanol standard solutions of perfluorohexanoic acid, perfluoroundecanoic acid, and perfluoroethercarboxylic acid A having known concentrations of 1 ng/mL to 100 ng/mL were prepared, and measurement was made using a liquid chromatograph-mass spectrometer (Waters, LC-MS ACQUITY UPLC/TQD). First-order approximation was used to create calibration curves from the sample concentrations and peak integral values thereof.

Measuring instrument configuration and LC-MS measurement conditions

TABLE 1

| | | | |
|---|---|---|---|
| LC unit | | | |
| | Equipment | Acquity UPLC manufactured by Waters | |
| | Column | Acquity UPLC BEH Shield R.P18 1.7 μm (2.1 × 50 mm) manufactured by Waters | |
| | Mobile phase | A $CH_3CN$ | |
| | | B 20 mM $CH_3COONH_4/H_2O$ | |
| | | 0 → 1.5 min | A:B = 10:90 |
| | | 15 → 8.5 min | A:B = 10:90 → A:B = 90:10 Linear gradient |
| | | 8.5 → 10 min | A:B = 90:10 |
| | Flow rate | 0.4 mL/min | |
| | Column temperature | 40° C. | |
| | Sample injection amount | 5 μL | |
| MS unit | | | |
| | Equipment | TQ Detecter | |
| | Measurement mode | MRM (Multiple Reaction Monitoring) | |
| | Ionization method | Electrospray ionization | |
| | | Negative mode | |

TABLE 2

| MRM measurement parameters | | |
|---|---|---|
| Compound | Precursor | Product |
| Perfluorohexanoic acid | 313 | 269 |
| Perfluoroundecanoic acid | 563 | 519 |
| Perfluoroethercarboxylic acid A | 395 | 351 |

2. Content of perfluorohexanoic acid contained in extract

Perfluorohexanoic acid was measured using a liquid chromatograph-mass spectrometer. The extract was suitably diluted with methanol to prepare a measurement solution such that the amount of perfluorohexanoic acid in the measurement solution was within the calibration curve. Concerning the measurement solution, the peak area of perfluorohexanoic acid was determined using an MRM method, and the content of perfluorohexanoic acid was determined from the calibration curve.

3. Content of perfluoroundecanoic acid contained in extract

Perfluoroundecanoic acid was measured using a liquid chromatograph-mass spectrometer. The extract was suitably diluted with methanol to prepare a measurement solution such that the amount of perfluoroundecanoic acid in the measurement solution was within the calibration curve. Concerning the measurement solution, the peak area of perfluoroundecanoic acid was determined using an MRM method, and the content of perfluoroundecanoic acid was determined from the calibration curve.

4. Content of perfluoroethercarboxylic acid A contained in extract

Perfluoroethercarboxylic acid A was measured using a liquid chromatograph-mass spectrometer. The extract was suitably diluted with methanol to prepare a measurement solution such that the amount of perfluoroethercarboxylic acid A in the measurement solution was within the calibration curve. Concerning the measurement solution, the peak area of perfluoroethercarboxylic acid A was determined using an MRM method, and the content of perfluoroethercarboxylic acid A was determined from the calibration curve.

Production Example 1

A polymerization reaction of TFE was performed in the same manner as the method described in Example 7 of International Publication No. WO 2009/0210187 except that the amount of ammonium perfluorohexanoate was changed from 1.7 g to 2.0 g, and the reaction was terminated.

Then, the reactor was evacuated until the pressure inside the reactor reached atmospheric pressure, the pressure was further reduced to −0.01 MPaG, the reactor was nitrogen-purged to atmospheric pressure (0.00 MPaG), and thus an aqueous PTFE dispersion 1 was obtained. It took 5.0 hours to obtain the aqueous PTFE dispersion 1.

The aqueous PTFE dispersion 1 was taken out from the reactor into air and cooled to give an aqueous PTFE dispersion 2. Various physical properties of the resulting aqueous PTFE dispersion 2 were measured. The results are shown in Table 3.

Nitric acid was added to the resulting aqueous PTFE dispersion 2, the mixture was subjected to strong mechanical shearing force to coagulate, the resulting wet powder was dried, and thus a PTFE powder was obtained. Various physical properties of the resulting PTFE powder were measured. The results are shown in Table 3.
Accordingly, it was found that the resulting PTFE powder is low molecular weight PTFE.

TABLE 3

| | | Production Example 1 |
|---|---|---|
| Solid concentration | % by mass | 20.4 |
| Melt viscosity | Pa · s | $1.6 \times 10^4$ |
| Peak temperature | ° C. | 329 |

Synthesis Example 1

A 1 L autoclave was nitrogen-purged, charged with 16.5 g of dehydrated tetramethylurea and 220 g of diethylene glycol dimethyl ether, and cooled. Then, 38.5 g of carbonyl fluoride was added, then 100 g of hexafluoropropylene oxide was introduced, and the mixture was stirred. Then, 38.5 g of carbonyl fluoride and 100 g of hexafluoropropylene oxide were further added. Then, the same amounts of carbonyl fluoride and hexafluoropropylene oxide were further added. After completion of the reaction, the reaction mixture was taken out and separated, and thus the reaction product in the lower phase was obtained.

A 6 L autoclave was charged with 1,000 ml of tetraglyme and CsF (75 g), and nitrogen-purged. Then, the autoclave was cooled and charged with 2,100 g of the reaction product obtained above, and hexafluoropropylene oxide was introduced into the autoclave to initiate the reaction. Eventually, 1,510 g of hexafluoropropylene oxide was added. Then, the contents were taken out, and separated into the upper phase and the lower phase using a separatory funnel. The upper phase had 1,320 g, and the lower phase had 3,290 g. The lower phase was rectified.

Next, 1,000 g of pure water was added to 1,000 g of the product obtained by rectifying the lower phase to perform hydrolysis. Then, the organic phase (the lower phase) was recovered by liquid separation using a separatory funnel. The recovered organic phase (the lower phase) was washed with a sulfuric acid solution. The washed organic phase was subjected to simple distillation to give a distillate. Moreover, 500 g of the distillate obtained above was added dropwise to an aqueous solution obtained by mixing 76 g of a 28% by mass aqueous ammonia solution and 600 g of pure water. After completion of dropwise addition, the pH was regulated to 7 by adding a 28% by mass aqueous ammonia solution. The mixture was freeze-dried, and thus a white solid A (perfluoroethercarboxylic acid A) was obtained.

Production Example 2

First, 3,580 g of deionized water and 7.56 g of white solid A obtained in Synthesis Example 1 were added to a stirrer-equipped SUS reactor having an internal volume of 6 L. Then, the contents of the reactor were suctioned while being heated to 70 °C and, at the same time, the reactor was purged with TFE to remove oxygen in the reactor, and the contents were stirred. After 0.5 g of ethane and 71 g of perfluoropropyl vinyl ether (PPVE) were added to the reactor, TFE was added until a pressure of 2.4 MPaG was reached. Then, 306 mg of an ammonium persulfate (APS) initiator dissolved in 20 g of deionized water was added to the reactor. The pressure dropped after injection of the initiator, and the initiation of polymerization was observed. TFE was added to the reactor to maintain a constant pressure of 2.4 MPaG. After the initiation of polymerization, 108 mg of ammonium persulfate and 84 g of PPVE were continuously added. When TFE consumed in the reaction reached about 1,600 g, the feeding of TFE was stopped, stirring was stopped, and thus the reaction was terminated.

Then, the reactor was evacuated until the pressure inside the reactor reached atmospheric pressure, the pressure was further reduced to-0.01 MPaG, nitrogen was added to the reactor to atmospheric pressure (0.00 MPaG), and thus an aqueous PFA dispersion 3 was obtained. It took 4.0 hours to obtain the aqueous PFA dispersion.

The aqueous PFA dispersion 3 was taken out from the reactor into air and cooled to give an aqueous PFA dispersion 4. Various physical properties of the resulting aqueous PFA dispersion 4 were measured. The results are shown in Table 4.

The resulting aqueous PFA dispersion 4 was stirred, coagulated, and dried. Various physical properties of the resulting PFA powder were measured. The results are shown in Table 4.

TABLE 4

| | | Production Example 2 |
|---|---|---|
| Solid concentration | % by mass | 30.5 |
| PPVE content | % by mass | 6.5 |
| MFR | g/10 min | 2.1 |
| Melting point | ° C. | 295 |

Production Example 3

First, 3,580 g of deionized water, 160 g of paraffin wax, and 4.7 g of white solid A obtained in Synthesis Example 1 as a fluorine-containing surfactant were added to a stirrer-equipped SUS reactor having an internal volume of 6 L. Then, the contents of the reactor were suctioned while being heated to 70 °C and, at the same time, the reactor was purged with TFE to remove oxygen in the reactor, and the contents were stirred. Then, 6.5 g of PPVE was injected with TFE into the reactor. Then, 50 mg of APS dissolved in 20 g of deionized water as an initiator was added to the reactor, and the pressure was regulated to 1.5 MPaG. TFE was added so as to maintain a constant pressure of 1.5 MPaG. When TFE consumed in the reaction reached 1,543 g, the feeding of TFE was stopped, stirring was stopped, and thus the reaction was terminated.

Then, the reactor was evacuated until the pressure inside the reactor reached atmospheric pressure, the pressure was further reduced to-0.01 MPaG, nitrogen was added to the reactor to atmospheric pressure (0.00 MPaG), and thus an aqueous PTFE dispersion 5 was obtained. It took 5.0 hours to obtain the aqueous PTFE dispersion 5.

The aqueous PTFE dispersion 5 was taken out from the reactor into air and cooled, paraffin wax was removed, and thus an aqueous PTFE dispersion 6 was obtained. Various physical properties of the resulting aqueous PTFE dispersion 6 were measured. The results are shown in Table 5.

The resulting aqueous PTFE dispersion 6 was coagulated, and the coagulated wet powder was dried. Various physical properties of the resulting PTFE powder were measured. The results are shown in Table 5.

TABLE 5

| | | Production Example 3 |
|---|---|---|
| Solid concentration | % by mass | 30.0 |
| SSG | — | 2.163 |
| PPVE content | % by mass | 0.28 |

Comparative Example 1

First, 14.7 g of the aqueous PTFE dispersion 2 obtained in Production Example 1 and 7.3 g of deionized water were added to a screw cap tube having an internal volume of 100 ml, 10 ml of methanol was added, and the mixture was sufficiently shaken until being agglomerated and, moreover, centrifuged at 4,000 rpm for 1 hour to separate the polymer.

The resulting extract was analyzed. The measurement results are shown in Table 6.

Example 1

With the aqueous PTFE dispersion 1 obtained in Production Example 1 being in the reactor, the contents of the reactor were heated to 80 °C in 30 minutes in a nitrogen atmosphere and retained for 3 hours to give an aqueous PTFE dispersion 1-1.

The aqueous PTFE dispersion 1-1 was taken out from the reactor into air and cooled to give an aqueous PTFE dispersion 1-2. The subsequent operation was performed in the same manner as Comparative Example 1 to give an extract. The measurement results are shown in Table 6.

Example 2

The same operation as Example 1 was performed except that 7.83 g of ammonium persulfate was added as an inorganic peroxide when the temperature reached 80 °C. The measurement results are shown in Table 6.

TABLE 6

| | | Comparative Example 1 | Example 1 | Example 2 |
|---|---|---|---|---|
| Perfluorohexanoic acid | ppm/polymer | $2.4 \times 10^3$ | $2.1 \times 10^3$ | $2.2 \times 10^2$ |

Comparative Example 2

First, 10 g of the aqueous PFA dispersion 4 obtained in Production Example 2 and 11 g of deionized water were added to a screw cap tube having an internal volume of 100 ml, and the same operation as Comparative Example 1 was performed. The resulting extract was analyzed. The measurement results are shown in Table 7.

Example 3

With the aqueous PFA dispersion 3 obtained in Production Example 2 being in the reactor, the contents of the reactor were heated to 80 °C in 10 minutes in a nitrogen atmosphere and retained for 3 hours to give an aqueous PFA dispersion 3-1.

The aqueous PFA dispersion 3-1 was taken out from the reactor into air and cooled to give an aqueous PFA dispersion 3-2. The subsequent operation was performed in the same manner as Comparative Example 2 to give an extract. The measurement results are shown in Table 7.

Example 4

The same operation as Example 3 was performed except that 31.8 g of ammonium persulfate was added as an inorganic peroxide when the temperature reached 80 °C. The measurement results are shown in Table 7.

TABLE 7

| | | Comparative Example 2 | Example 3 | Example 4 |
|---|---|---|---|---|
| Perfluoroundecanoic acid | ppb/polymer | $1.3 \times 10^3$ | $1.2 \times 10^3$ | |
| Perfluoroethercarboxylic acid A | ppm/polymer | $1.4 \times 10^3$ | $1.3 \times 10^3$ | $3.8 \times 10^1$ |

Comparative Example 3

First, 10.2 g of the aqueous PTFE dispersion 6 obtained in Production Example 3 and 2.7 g of deionized water were added to a screw cap tube having an internal volume of 100 ml, and the same operation as Comparative Example 1 was performed. The resulting extract was analyzed. The measurement results are shown in Table 8.

Example 5

With the aqueous PTFE dispersion 5 obtained in Production Example 3 being in the reactor, the contents of the reactor were heated to 80 °C in 10 minutes in a nitrogen atmosphere and retained for 3 hours to give an aqueous PTFE dispersion 5-1.

The aqueous PTFE dispersion 5-1 was taken out from the reactor into air and cooled, paraffin wax was removed, and thus an aqueous PTFE dispersion 5-2 was obtained. The subsequent operation was performed in the same manner as Comparative Example 3 to give an extract. The measurement results are shown in Table 8.

Example 6

The same operation as Example 5 was performed except that 9.44 g of ammonium persulfate was added as an inorganic peroxide when the temperature reached 80 °C. The measurement results are shown in Table 8.

TABLE 8

| | | Comparative Example 3 | Example 5 | Example 6 |
|---|---|---|---|---|
| Perfluoroethercarboxylic acid A | ppm/polymer | $6.1 \times 10^2$ | $6.0 \times 10^2$ | 6.7 |

What is claimed is:

1. A fluoropolymer composition production method for producing a fluoropolymer composition comprising a fluoropolymer, the method comprising:

polymerizing a fluoromonomer in a reactor in the presence of a fluorine-containing surfactant, a polymerization initiator, and an aqueous medium to prepare an aqueous dispersion comprising a fluoropolymer;

after the aqueous dispersion is prepared, reducing a pressure in the reactor to lower than 0.00 MPaG, and then feeding an inert gas to the reactor; and subjecting to a heat treatment the aqueous dispersion in the reactor to give a fluoropolymer composition, wherein a temperature of the heat treatment is 35 °C or higher and a time of the heat treatment is 15 minutes or more.

2. The fluoropolymer composition production method according to claim 1, wherein the pressure in the reactor is increased to 0.00 MPaG or higher by feeding the inert gas to the reactor.

3. The fluoropolymer composition production method according to claim 1, wherein a content of the fluoropolymer in the aqueous dispersion to be subjected to the heat treatment is 1% by mass or more.

4. The fluoropolymer composition production method according to claim 1, wherein the fluoropolymer composition is an aqueous dispersion or a powder.

5. The fluoropolymer composition production method according to claim 1, the method comprising, after subjecting the heat treatment to give an aqueous dispersion as the fluoropolymer composition, cooling the aqueous dispersion.

6. The fluoropolymer composition production method according to claim 1, the method comprising adding a radical generator to the aqueous dispersion, and subjecting to the heat treatment the aqueous dispersion in the presence of the radical generator.

7. The fluoropolymer composition production method according to claim 1, the method comprising, after subjecting to the heat treatment to give an aqueous dispersion as the fluoropolymer composition, concentrating the aqueous dispersion.

8. The fluoropolymer composition production method according to claim 1, the method comprising, after subjecting to the heat treatment to give an aqueous dispersion as the fluoropolymer composition, agglomerating the fluoropolymer in the aqueous dispersion, and optionally drying an agglomerate.

9. The fluoropolymer composition production method according to claim 1, wherein the fluorine-containing surfactant is an anionic fluorine-containing surfactant represented by the following general formula ($N^0$):

$$X^{n0}-Rf^{n0}-Y^0 \quad (N^0)$$

wherein $X^{n0}$ is H, Cl, or F; $Rf^{n0}$ is a linear, branched, or cyclic alkylene group having 3 to 20 carbon atoms in which some or all of H are replaced by F, the alkylene group optionally containing one or more ether bonds in which some of H are optionally replaced by Cl; and $Y^0$ is an anionic group.

10. The fluoropolymer composition production method according to claim 1, wherein the aqueous dispersion obtained by polymerizing the fluoromonomer comprises a water-soluble, fluorine-containing compound having a molecular weight of 1,000 g/mol or less, and the fluoropolymer composition having a reduced content of the water-soluble, fluorine-containing compound is obtained by subjecting to the heat treatment.

11. The fluoropolymer composition production method according to claim 10, wherein the water-soluble, fluorine-containing compound is a compound represented by general formula (1):

$$[X—Rf-A^-]_iM^{i+} \quad \text{General Formula (1)}$$

wherein X is H, Cl, Br, F, or I; Rf is a linear or branched, partially fluorinated or fully fluorinated aliphatic group, or a linear or branched, partially or fully fluorinated aliphatic group interrupted by at least one oxygen atom; $A^-$ is an acid group; $M^{i+}$ is a cation having a valence of i; and i represents an integer of 1 to 3.

12. The fluoropolymer composition production method according to claim 10, wherein the water-soluble, fluorine-containing compound is a compound represented by general formula (2):

$$[C_{n-1}F_{2n-1}COO^-]M^+ \quad \text{General formula (2)}$$

wherein n is an integer of 9 to 12, and $M^+$ represents a cation.

13. The fluoropolymer composition production method according to claim 10, wherein the water-soluble, fluorine-containing compound is a compound represented by general formula (3):

$$[R^1—O-L-CO_2^-]M^+ \quad \text{General formula (3)}$$

wherein $R^1$ is a linear or branched, partially fluorinated or fully fluorinated aliphatic group, or a linear or branched, partially fluorinated or fully fluorinated aliphatic group interrupted by at least one oxygen atom; L represents a linear or branched non-fluorinated, partially fluorinated, or fully fluorinated alkylene group; and $M^+$ represents a cation.

14. The fluoropolymer composition production method according to claim 1, wherein the fluoropolymer is at least one selected from the group consisting of a polytetrafluoroethylene, a tetrafluoroethylene/fluoroalkyl vinyl ether copolymer, a tetrafluoroethylene/fluoroalkyl allyl ether copolymer, a tetrafluoroethylene/hexafluoropropylene copolymer, an ethylene/tetrafluoroethylene copolymer, an ethylene/tetrafluoroethylene/hexafluoropropylene copolymer, a polychlorotrifluoroethylene, a chlorotrifluoroethylene/tetrafluoroethylene copolymer, an ethylene/chlorotrifluoroethylene copolymer, a polyvinyl fluoride, a polyvinylidene fluoride, a vinylidene fluoride/tetrafluoroethylene copolymer, a fluoromonomer/vinyl ester copolymer, a polymer of a fluoromonomer represented by general formula (150): $CF_2=CF—O—(CF_2CFY^{151}—O)n—(CFY^{152})m—A^{151}$, wherein $Y^{151}$ represents fluorine atom, chlorine atom, $—SO_2F$ group, or a perfluoroalkyl group; the perfluoroalkyl group optionally contains ether oxygen or 13 $SO_2F$ group; n represents an integer of 0 to 3; n $Y^{151}$ groups are the same or different; $Y^{152}$ represents fluorine atom, chlorine atom, or 13 $SO_2F$ group; m represents an integer of 1 to 5; m $Y^{152}$ groups are the same or different; $A^{151}$ represents $—SO_2X^{151}$, $—COZ^{151}$, or $—POZ^{152}Z^{153}$; $X^{151}$ represents F, Cl, Br, I, $—OR^{151}$, or $—NR^{152}R^{153}$; $Z^{151}$, $Z^{152}$, and $Z^{153}$ are the same or different, and each independently represent $—NR^{154}R^{155}$ or $—OR^{156}$; and $R^{151}$, $R^{152}$, $R^{153}$, $R^{154}$, $R^{155}$, and $R^{156}$ are the same or different, and each independently represent H, ammonium, an alkali metal, or an alkyl group, an aryl group, or a sulfonyl-containing group optionally containing fluorine atom; and a fluoroelastomer.

15. A fluoropolymer composition production method for producing a fluoropolymer composition comprising a fluoropolymer, the method comprising:

polymerizing a fluoromonomer in a reactor in the presence of a fluorine-containing surfactant, a polymerization initiator, and an aqueous medium to prepare an aqueous dispersion comprising a fluoropolymer;

feeding an inert gas to the reactor; and adding a radical generator to the aqueous dispersion, and subjecting to a heat treatment the aqueous dispersion in the reactor in the presence of the radical generator to give a fluoropolymer composition, wherein a temperature of the heat treatment is 35 °C or higher and a time of the heat treatment is 15 minutes or more.

16. A fluoropolymer composition production method for producing a fluoropolymer composition comprising a fluoropolymer, the method comprising:

polymerizing a fluoromonomer in a reactor in the presence of a fluorine-containing surfactant, a polymerization initiator, and an aqueous medium to prepare an aqueous dispersion comprising a fluoropolymer;

feeding an inert gas to the reactor; and subjecting to a heat treatment the aqueous dispersion in the reactor to give a fluoropolymer composition, wherein a temperature of the heat treatment is 35 °C or higher and a time of the heat treatment is 15 minutes or more, and the aqueous dispersion obtained by polymerizing the fluoromonomer comprises a water-soluble, fluorine-containing compound having a molecular weight of 1,000 g/mol or less, and the fluoropolymer composition having a reduced content of the water-soluble, fluorine-containing compound is obtained by subjecting to the heat treatment.

* * * * *